US012719732B2

(12) United States Patent
Carsello et al.

(10) Patent No.: US 12,719,732 B2
(45) **Date of Patent: *Aug. 25, 2026**

(54) ORTHOGONAL FREQUENCY DIVISION MULTIPLEX PACKET DETECTION USING THE LONG PREAMBLE

(71) Applicant: SR Technologies, Inc., Sunrise, FL (US)

(72) Inventors: Stephen R. Carsello, Plantation, FL (US); John C. Sinibaldi, Pompano Beach, FL (US); Caryn Chan, Plantation, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/900,222

(22) Filed: Sep. 27, 2024

(65) Prior Publication Data

US 2025/0227018 A1 Jul. 10, 2025

Related U.S. Application Data

(63) Continuation of application No. 18/306,460, filed on Apr. 25, 2023, now Pat. No. 12,126,485.

(60) Provisional application No. 63/336,558, filed on Apr. 29, 2022.

(51) Int. Cl.
*H04L 27/38* (2006.01)

(52) U.S. Cl.
CPC .................................... *H04L 27/38* (2013.01)

(58) Field of Classification Search
CPC ............... H04L 27/38; H04L 27/03159; H04L 27/2649
See application file for complete search history.

(56) References Cited

U.S. PATENT DOCUMENTS

| | | | | |
|---|---|---|---|---|
| 7,830,973 B2 * | 11/2010 | Cho | H04L 27/2675 | 375/267 |
| 9,008,167 B2 * | 4/2015 | Azizi | H04L 25/0226 | 370/206 |

* cited by examiner

*Primary Examiner* — Vineeta S Panwalkar
(74) *Attorney, Agent, or Firm* — Goodwin Procter LLP

(57) ABSTRACT

A method for detection of an orthogonal frequency division multiplex (OFDM) packet preamble is described. The method includes quantizing a real part and an imaginary part of each complex template value to a template index value, determining a plurality of non-zero template index values based on the quantization, receiving a signal including a plurality of samples, performing a plurality of first sums, where each first sum sums a sample subset of plurality of sample subsets, and assigning the plurality of non-zero template index values to the plurality of first sums. The method further includes performing a transposition of each first sum using the assigned non-zero template index value, performing a second sum, where the second sum is a complex weighted sum of the transposition of each first sum, and determining that the received signal comprises the OFDM packet preamble based on the complex weighed sum.

20 Claims, 19 Drawing Sheets

| | |
|---|---|
| Std Dev, Re | 0.080 |
| Std Dev, Im | 0.080 |

320

| | | | | | | | | | | | | | | | | | |
|---|---|---|---|---|---|---|---|---|---|---|---|---|---|---|---|---|---|
| 301 | Sample | 0 | 1 | 2 | 3 | 4 | 5 | 6 | 7 | 8 | 9 | 10 | 11 | 12 | 13 | 14 | 15 |
| 302 | Re | -0.156 | 0.012 | 0.092 | -0.092 | -0.003 | 0.075 | -0.127 | -0.122 | -0.035 | -0.056 | -0.060 | 0.070 | 0.082 | -0.131 | -0.057 | 0.037 |
| 303 | Im | 0.000 | -0.098 | -0.106 | -0.115 | -0.054 | 0.074 | 0.021 | 0.017 | 0.151 | 0.022 | -0.081 | -0.014 | -0.092 | -0.065 | -0.039 | -0.098 |
| 304 | MIN Re | -1 | 0 | 1 | -1 | 0 | 1 | -1 | -1 | 0 | -1 | -1 | 1 | 1 | -1 | -1 | 0 |
| 305 | MIN Im | 0 | -1 | -1 | -1 | -1 | 1 | 0 | 0 | 1 | 0 | -1 | 0 | -1 | -1 | 0 | -1 |

| | | | | | | | | | | | | | | | | | |
|---|---|---|---|---|---|---|---|---|---|---|---|---|---|---|---|---|---|
| 311 | Sample | 16 | 17 | 18 | 19 | 20 | 21 | 22 | 23 | 24 | 25 | 26 | 27 | 28 | 29 | 30 | 31 |
| 312 | Re | 0.062 | 0.119 | -0.022 | 0.059 | 0.024 | -0.137 | 0.001 | 0.053 | 0.098 | -0.038 | -0.115 | 0.060 | 0.021 | 0.097 | 0.040 | -0.005 |
| 313 | Im | 0.063 | 0.004 | -0.161 | 0.015 | 0.059 | 0.047 | 0.115 | -0.004 | 0.026 | 0.106 | 0.055 | 0.088 | -0.028 | -0.083 | 0.111 | 0.120 |
| 314 | MIN Re | 1 | 1 | 0 | 1 | 0 | -1 | 0 | 1 | 1 | 0 | -1 | 1 | 0 | 1 | 0 | 0 |
| 315 | MIN Im | 1 | 0 | -1 | 0 | 1 | 1 | 1 | 0 | 0 | 1 | 1 | 1 | 0 | -1 | 1 | 1 |

| | Samples | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|---|
| | | 64 | 65 | 66 | 67 | 68 | 69 | 70 | 71 | 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 |
| | | 128 | 129 | 130 | 131 | 132 | 133 | 134 | 135 | 136 | 137 | 138 | 139 | 140 | 141 | 142 | 143 | 144 | 145 | 146 | 147 | 148 | 149 | 150 | 151 | 152 | 153 | 154 | 155 | 156 | 157 | 158 | 159 |
| 411 | M1 | | | | | | | | | X | | | | | | | | | | | | X | | X | | | X | | | | | X | X |
| 412 | M2 | | X | | | X | | | | | | | | | | | X | | | X | | | | | | | | | | | | | |
| 413 | M3 | | | | | | | | | | | | X | | | | | | X | | X | | | | X | X | | | | | | | |
| 414 | M4 | | | | | | X | | | | | | | | | | | X | | | | | | | | | | | X | | | | |
| 415 | M5 | | | X | | | | | | | | | | X | | | | | | | | | | | | | | | | | X | | |
| 416 | M6 | X | | | | | | X | X | | X | | | | | X | | | | | | | | | | | | | | | | | |
| 417 | M7 | | | | | | | | | | | | | | | | | | | | | | X | | | | | X | | | | | |
| 418 | M8 | | | | X | | | | | | | X | | | X | | | | | | | | | | | | | | | X | | | |

| | Samples | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|---|---|---|---|---|---|---|---|---|---|---|---|---|---|---|
| | | 96 | 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 | 125 | 126 | 127 |
| 511 | M1 | | | | | | | | | | | | | | | X | | | X | | | | | | | | | | | X | | | X |
| 512 | M2 | | X | X | | | | | X | | | X | | X | | | | | | | | | | | | X | | | | | | | |
| 513 | M3 | X | | | | | | | | X | X | | | | X | | X | | | | | | X | | | | | | | | | | |
| 514 | M4 | | | | X | | | | | | | | | | | | | | | | | X | | | | | | | | | | X | |
| 515 | M5 | | | | | | X | | | | | | | | | | | X | | | | | | | | | | | X | | | | |
| 516 | M6 | | | | | | | | | | | | | | | | | | | X | | | | | X | | X | X | | | | | |
| 517 | M7 | | | | | | | | | | | | | | | | | | | | X | | | X | | | | | | | X | | |
| 518 | M8 | | | | | X | | X | | | | | X | | | | | | | | | | | | | | | | | | | | |

600
601
602
Length-N Tap Delay Line
610
621
622
623
624
625
626
627
628
i=1
i=2
i=3
i=4
i=5
i=6
i=7
i=8
631
632
633
634
635
636
637
638
640
Correlator Block
660
650

| | | | | | | | | | | | | | | | | | |
|---|---|---|---|---|---|---|---|---|---|---|---|---|---|---|---|---|---|
| 801 | Sample | 0 | 1 | 2 | 3 | 4 | 5 | 6 | 7 | 8 | 9 | 10 | 11 | 12 | 13 | 14 | 15 |
| 802 | Re | -0.156 | 0.012 | 0.092 | -0.092 | -0.003 | 0.075 | -0.127 | -0.122 | -0.035 | -0.056 | -0.060 | 0.070 | 0.082 | -0.131 | -0.057 | 0.037 |
| 803 | Im | 0.000 | -0.098 | -0.106 | -0.115 | -0.054 | 0.074 | 0.021 | 0.017 | 0.151 | 0.022 | -0.081 | -0.014 | -0.092 | -0.065 | -0.039 | -0.098 |
| | Offset for *k* =1 | | | | | | | | | | | | | | | | |
| 804 | Re | 1.000 | 1.000 | 0.999 | 0.997 | 0.995 | 0.992 | 0.989 | 0.985 | 0.981 | 0.976 | 0.970 | 0.964 | 0.957 | 0.950 | 0.942 | 0.933 |
| 805 | Im | 0.000 | 0.025 | 0.049 | 0.074 | 0.098 | 0.122 | 0.147 | 0.171 | 0.195 | 0.219 | 0.243 | 0.267 | 0.290 | 0.314 | 0.337 | 0.360 |
| | Product | | | | | | | | | | | | | | | | |
| 806 | Re | -0.156 | 0.012 | 0.087 | -0.085 | -0.003 | 0.065 | -0.107 | -0.099 | -0.028 | -0.043 | -0.044 | 0.048 | 0.055 | -0.083 | -0.035 | 0.021 |
| 807 | Im | 0.000 | -0.097 | -0.101 | -0.122 | -0.054 | 0.083 | 0.002 | -0.005 | 0.141 | 0.009 | -0.094 | 0.005 | -0.065 | -0.103 | -0.056 | -0.078 |
| 808 | MIN Re | -1 | 0 | 1 | -1 | 0 | 1 | -1 | -1 | 0 | -1 | -1 | 1 | 1 | -1 | 0 | 0 |
| 809 | MIN Im | 0 | -1 | -1 | -1 | -1 | 1 | 0 | 0 | 1 | 0 | -1 | 0 | -1 | -1 | -1 | -1 |
| 830 | | M6 | M2 | M5 | M8 | M2 | M4 | M6 | M6 | M1 | M6 | M8 | M3 | M5 | M8 | M2 | M2 |

| | | | | | | | | | | | | | | | | | |
|---|---|---|---|---|---|---|---|---|---|---|---|---|---|---|---|---|---|
| 810 | Sample | 16 | 17 | 18 | 19 | 20 | 21 | 22 | 23 | 24 | 25 | 26 | 27 | 28 | 29 | 30 | 31 |
| 811 | Re | 0.062 | 0.119 | -0.022 | 0.059 | 0.024 | -0.137 | 0.001 | 0.053 | 0.098 | -0.038 | -0.115 | 0.060 | 0.021 | 0.097 | 0.040 | -0.005 |
| 812 | Im | 0.063 | 0.004 | -0.161 | 0.015 | 0.059 | 0.047 | 0.115 | -0.004 | 0.026 | 0.106 | 0.055 | 0.088 | -0.028 | -0.083 | 0.111 | 0.120 |
| | Offset for *k* =1 | | | | | | | | | | | | | | | | |
| 813 | Re | 0.924 | 0.914 | 0.904 | 0.893 | 0.882 | 0.870 | 0.858 | 0.845 | 0.831 | 0.818 | 0.803 | 0.788 | 0.773 | 0.757 | 0.741 | 0.724 |
| 814 | Im | 0.383 | 0.405 | 0.428 | 0.450 | 0.471 | 0.493 | 0.514 | 0.535 | 0.556 | 0.576 | 0.596 | 0.615 | 0.634 | 0.653 | 0.672 | 0.690 |
| | Product | | | | | | | | | | | | | | | | |
| 815 | Re | 0.034 | 0.061 | -0.011 | 0.026 | 0.010 | -0.052 | 0.000 | 0.017 | 0.027 | -0.009 | -0.024 | 0.010 | 0.003 | 0.010 | 0.003 | 0.000 |
| 816 | Im | 0.082 | 0.052 | -0.155 | 0.040 | 0.063 | -0.026 | 0.099 | 0.025 | 0.076 | 0.065 | -0.024 | 0.106 | -0.008 | 0.001 | 0.109 | 0.084 |
| 817 | MIN Re | 0 | 1 | 0 | 0 | 0 | -1 | 0 | 0 | 0 | 0 | 0 | 0 | 0 | 0 | 0 | 0 |
| 818 | MIN Im | 1 | 1 | -1 | 0 | 1 | 0 | 1 | 0 | 1 | 1 | 0 | 1 | 0 | 0 | 1 | 1 |
| 831 | | M1 | M4 | M2 | M8 | M1 | M6 | M1 | M8 | M1 | M1 | M8 | M1 | M8 | M8 | M1 | M1 |

900
601
$r_n$
2
Tap Delay Line N=32
710
702
$r_{n+1-32}$
MUX 720
MUX 901
CORR32-2
903
CORR32-1
904
905
$z^{-32}$
906
$z^{-64}$
907
$z^{-64}$
908
$z^{-64}$
$y_{2,n}^{(32,0)}$
$y_{2,n-64}^{(32,0)}$
$y_{2,n-128}^{(32,0)}$
$y_{1,n-32}^{(32,0)}$
$y_{1,n-96}^{(32,0)}$
$\Sigma$
909
915
$y_n^{(160,0)}$ $|y^{160,0}|^2$ CFO = 116000 Hz 2
1
0
1410
100 150 200 250 300 350 400 450 500 550 600
Time (samples)

$|y^{160,1}|^2$ 10
5
0
1420
1421
100 150 200 250 300 350 400 450 500 550 600
Time (samples)

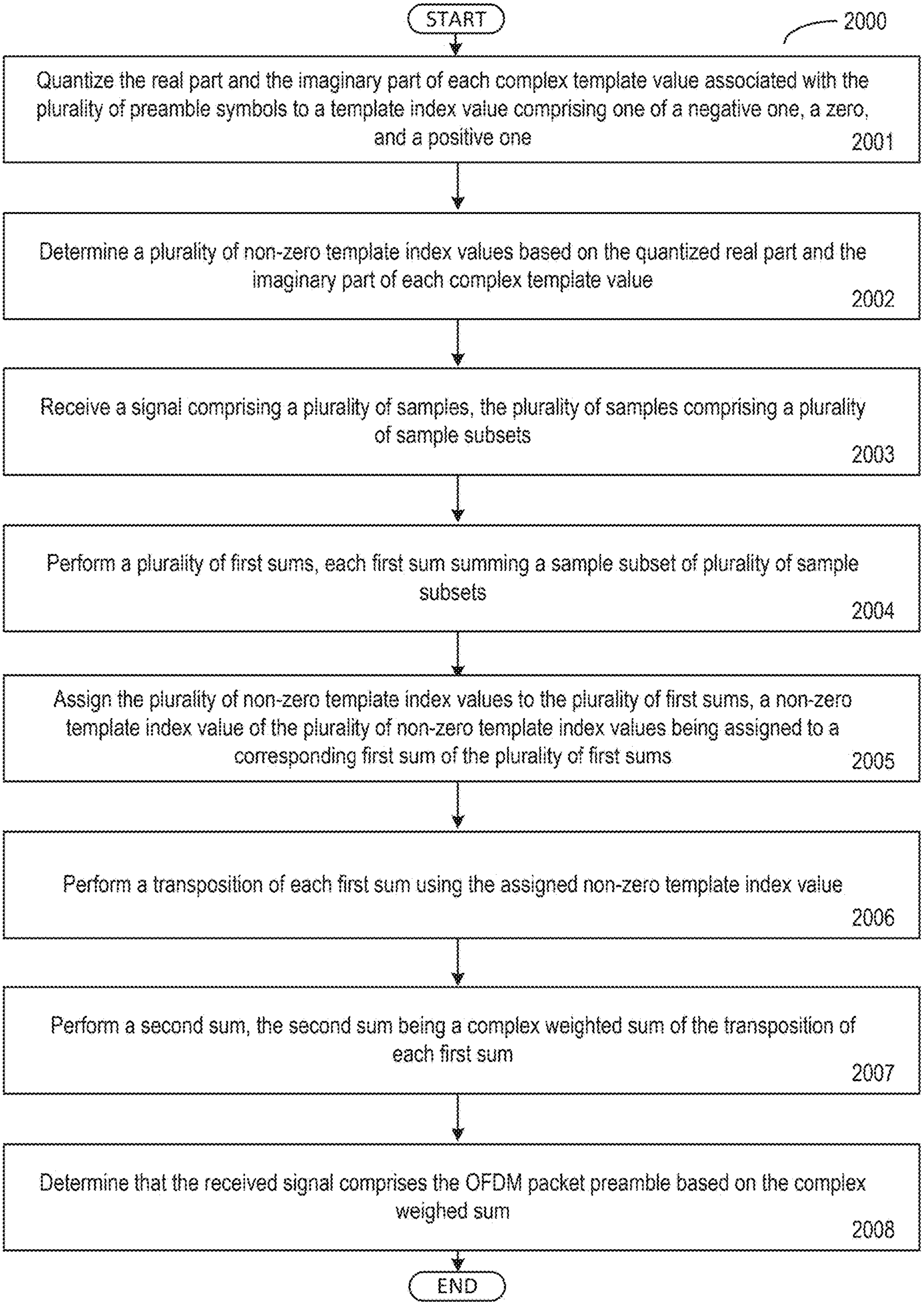

FIG. 20

Quantize the real part and the imaginary part of each complex template value associated with the plurality of preamble symbols to a template index value comprising one of a negative one, a zero, and a positive one 2001

Determine a plurality of non-zero template index values based on the quantized real part and the imaginary part of each complex template value 2002

Receive a signal comprising a plurality of samples, the plurality of samples comprising a plurality of sample subsets 2003

Perform a plurality of first sums, each first sum summing a sample subset of plurality of sample subsets 2004

Assign the plurality of non-zero template index values to the plurality of first sums, a non-zero template index value of the plurality of non-zero template index values being assigned to a corresponding first sum of the plurality of first sums 2005

Perform a transposition of each first sum using the assigned non-zero template index value 2006

Perform a second sum, the second sum being a complex weighted sum of the transposition of each first sum 2007

Determine that the received signal comprises the OFDM packet preamble based on the complex weighed sum 2008

ORTHOGONAL FREQUENCY DIVISION MULTIPLEX PACKET DETECTION USING THE LONG PREAMBLE

CROSS-REFERENCE TO RELATED APPLICATION

This application is a continuation of U.S. patent application Ser. No. 18/306,460, filed on Apr. 25, 2023 and titled "ORTHOGONAL FREQUENCY DIVISION MULTIPLEX PACKET DETECTION USING THE LONG PREAMBLE," which claims priority to U.S. Provisional Patent Application Ser. No. 63/336,558, filed on Apr. 29, 2022 and titled "ORTHOGONAL FREQUENCY DIVISION MULTIPLEX PACKET DETECTION USING THE LONG PREAMBLE," the entire contents of each of which is incorporated herein by reference.

TECHNICAL FIELD

The present disclosure relates to the detection of orthogonal frequency division multiplex (OFDM) for Institute of Electrical and Electronics Engineers (IEEE) 802.11 wireless local area network (WLAN) devices.

BACKGROUND

Initially, it is noted that IEEE Standard 802.11-2020 is used as the base reference for disclosures used herein, the entire contents of which are incorporated herein by reference. The IEEE 802.11-2020 Standard is commonly referred to as "Wi-Fi" and is referred to as such herein. The IEEE 802.11-2020 Standard is also referred to herein as the "Standard".

The Standard, at Clause 17.3.3., defines the "PHY Preamble field" for OFDM physical layer, PHY for "Clause 17 OFDM" devices, commonly referred to as "IEEE 802.11a" or "Wi-Fi 11a" devices. The OFDM PHY Preamble field is used for detection.

FIG. 1 is a diagram showing the structure of the OFDM Preamble field 100. The OFDM preamble field 100 consists of two main parts: the short preamble 110, and the long preamble 120. The short preamble 110 comprises 10 short training symbols, the long preamble 120 comprises two long training symbols and there is a cyclic prefix, CP 115, between the short preamble 110 and the long preamble 120. Each short training symbol is identical and 16 samples long. The two long training symbols are identical. The CP 115 is a 32-sample cyclic prefix that protects the long preamble 120 from intersymbol interference, ISI, caused by the short preamble training symbols. The short preamble 110 is intended to provide initial signal detection and coarse synchronization in both frequency and time. The long preamble is intended to provide further detection with channel and fine frequency offset estimations General methods for packet detection and carrier frequency offset are known and are beyond the scope of the disclosure.

The general method for packet detection is to autocorrelate the received signal where the received signal is cross-correlated with a delayed version of the received signal, where the delay D is the period of the short preamble which is ten training symbols, i.e., 8 μs. For a received signal $r_n$ a decision statistic $m_n$ is calculated over a window of length L:

$$m_n = \frac{|c_n|^2}{(p_n)^2} \tag{1}$$

-continued where $$c_n = \sum_{k=0}^{L-1} r_{n+k} r_{n+k+D}^*$$

$$p_n = \sum_{k=0}^{L-1} |r_{n+k+D}|^2$$

When the received signal consists only of noise, the output c of the autocorrelation is zero-mean random variable. Once the start of the of the packet is received, $c_n$ is the correlation of the identical short training symbols which causes $m_n$ to jump quickly to its maximum value. This jump is used as an estimate for the start of the packet.

After the packet detection estimation, a symbol timing algorithm may be used to refine the estimate to sample level precision. This may be performed by calculating the cross-correlation of the received signal and the known samples of the long training symbols. The value of n that corresponds to the maximum absolute value for the crosscorrelation is the symbol timing estimate $\hat{t}_s$ is:

$$\hat{t}_s = \text{argmax}_n \sum_{k=0}^{L-1} r_{n+k} t_k^* \tag{2}$$

One of the main drawbacks to OFDM is its sensitivity to carrier frequency offset. Clause 17 OFDM devices can have relatively large frequency offsets, ±20 parts per million that corresponds to ±116.5 kHz at the highest frequency 5825 MHz. The general method to estimate the frequency offset is one of complex correlation of the short preamble in conjunction with differential angle estimation to obtain an initial coarse frequency offset estimation.

In the general sense, such complex correlations require a large number of multiplications. Complex correlation requires computational complexity and a need for relatively large silicon areas due to the multiplication of complex numbers. In addition, in order to harness all the differential correlation energy, a $4^{th}$-power correlation energy detector would be required, which also requires increases in bit widths and digital signal processing DSP resource utilization. In particular, the detection of the long training sequences, using conventional correlation methods, requires a large number of complex multiplications in order to compute the real-time correlation.

SUMMARY

Some embodiments provide detection of a packet (and/or elements of the packet). In some embodiments, an OFDM packet is detected (e.g., by detecting an element of the packet such as a preamble).

According to one aspect, a method for detection of an orthogonal frequency division multiplex (OFDM) packet preamble using a plurality of complex template values associated with a plurality of preamble symbols is described. Each complex template value of the plurality of complex template values includes a real part and an imaginary part. The method includes quantizing the real part and the imaginary part of each complex template value associated with the plurality of preamble symbols to a template index value comprising one of a negative one, a zero, and a positive one, determining a plurality of non-zero template index values based on the quantized real part and the imaginary part of each complex template value, receiving a signal comprising a plurality of samples, where the plurality of samples includes a plurality of sample subsets, and performing a plurality of first sums, each first sum summing a sample subset of plurality of sample subsets. The method further includes assigning the plurality of non-zero template index values to the plurality of first sums, where a non-zero template index value of the plurality of non-zero template index values is assigned to a corresponding first sum of the plurality of first sums, performing a transposition of each first sum using the assigned non-zero template index value, performing a second sum, the second sum being a complex weighted sum of the transposition of each first sum, and determining that the received signal comprises the OFDM packet preamble based on the complex weighed sum.

In some embodiments, the complex weighed sum is a real time correlation signal of the received signal.

In some other embodiments, the method further includes delaying the received signal, where the delayed signal is associated with a tap delay line having a predetermined length and being used to perform the plurality of first sums.

In some embodiments, the method further includes determining a plurality of frequency offset step sizes, $f_0$, and a plurality of frequency offset indices, k, and determining, for each value of k, the plurality of complex template values with frequency offset $kf_0$, the quantizing of the real part and the imaginary part of each complex template value being performed for each value of k.

In some other embodiments, the OFDM packet preamble is an OFDM long preamble, and the method further includes determining that the OFDM long preamble is represented by two length-32 waveforms, $\{s_{1,n}\}$ and $\{s_{2,n}\}$.

In some embodiments, the OFDM long preamble is a length-160 OFDM long preamble comprising a sequence, $\{s_{2,n}\}\{s_{1,n}\}\{s_{2,n}\}\{s_{1,n}\}\{s_{2,n}\}$.

In some other embodiments, the method further includes determining a length-160 correlator comprising K correlators, where each K correlator has two length-32 correlators comprising delays and phasors, determining a maximum output of the K length-160 correlators, and determining whether the OFDM long preamble has been detected based on the maximum output.

In some embodiments, the method further includes determining the plurality of complex template values for K frequency offset indices k, the quantizing of the real part and the imaginary part of each complex template value being performed for each value of k.

In some other embodiments, the second sum is a length-160 long preamble signal, $$y_n^{(160,k)}$$

expressed as:

$$y_n^{(160,k)} = y_{2,n}^{(32,k)} + y_{1,n-32}^{(32,k)} + e^{j2\pi\cdot 64\cdot f_0 k/f_s}\cdot y_{2,n-64}^{(32,k)} + e^{j2\pi\cdot 64\cdot f_0 k/f_s}\cdot y_{1,n-96}^{(32,k)} + e^{j2\pi\cdot 128\cdot f_0 k/f_s}\cdot y_{2,n-128}^{(32,k)},$$

where k is a frequency offset index, $f_0$ is a frequency offset step size, $f_s$ is a sampling frequency, j is a square root of −1 and defines an imaginary part of a complex number, and n is an integer number that indexes the signal.

In some embodiments, the second sum is a length-160 long preamble signal, $$y_n^{(160,k)}$$

expressed as:

$$y_n^{(160,k)} = y_n^{(64,k)} + e^{j2\pi\cdot 64\cdot f_0 k/f_s}\cdot y_{n-64}^{(64,k)} + e^{j2\pi\cdot 128\cdot f_0 k/f_s}\cdot y_{n-128}^{(32,k)},$$

where k is a frequency offset index, $f_0$ is a frequency offset step size, and $f_s$ is a sampling frequency, j is a square root of −1 and defines an imaginary part of a complex number, and n is an integer number that indexes the signal.

According to another aspect, a wireless device (e.g., network traffic analyzer) configured for detection of an orthogonal frequency division multiplex (OFDM) packet preamble using a plurality of complex template values associated with a plurality of preamble symbols is described. Each complex template value of the plurality of complex template values includes a real part and an imaginary part, and the wireless device includes processing circuitry configured to quantize the real part and the imaginary part of each complex template value associated with the plurality of preamble symbols to a template index value comprising one of a negative one, a zero, and a positive one, determine a plurality of non-zero template index values based on the quantized real part and the imaginary part of each complex template value, receive a signal comprising a plurality of samples, where the plurality of samples includes a plurality of sample subsets, perform a plurality of first sums, each first sum summing a sample subset of plurality of sample subsets, and assign the plurality of non-zero template index values to the plurality of first sums. A non-zero template index value of the plurality of non-zero template index values is assigned to a corresponding first sum of the plurality of first sums. The processing circuitry is further configured to perform a transposition of each first sum using the assigned non-zero template index value, perform a second sum, the second sum being a complex weighted sum of the transposition of each first sum, and determine that the received signal comprises the OFDM packet preamble based on the complex weighed sum.

In some embodiments, in the complex weighed sum is a real time correlation signal of the received signal.

In some other embodiments, the processing circuitry is further configured to delay the received signal, where the delayed signal is associated with a tap delay line having a predetermined length and being used to perform the plurality of first sums.

In some embodiments, the processing circuitry is further configured to determine a plurality of frequency offset step sizes, $f_0$, and a plurality of frequency offset indices, k, and determine, for each value of k, the plurality of complex template values with frequency offset $kf_0$, the quantizing of the real part and the imaginary part of each complex template value is performed for each value of k.

In some other embodiments, the OFDM packet preamble is an OFDM long preamble, and the processing circuitry is further configured to determine that the OFDM long preamble is represented by two length-32 waveforms, $\{s_{1,n}\}$ and $\{s_{2,n}\}$.

In some embodiments, the OFDM long preamble is a length-160 OFDM long preamble comprising a sequence, $\{s_{2,n}\}\{s_{1,n}\}\{s_{2,n}\}\{s_{1,n}\}\{s_{2,n}\}$.

In some other embodiments, the processing circuitry is further configured to determine a length-160 correlator comprising K correlators, where each K correlator has two length-32 correlators comprising delays and phasors, determine a maximum output of the K length-160 correlators, and determine whether the OFDM long preamble has been detected based on the maximum output.

In some embodiments, the processing circuitry is further configured to determine the plurality of complex template values for K frequency offset indices k, where the quantizing of the real part and the imaginary part of each complex template value is performed for each value of k.

According to an aspect, a system comprising a wireless device configured for detection of an orthogonal frequency division multiplex (OFDM) long preamble using a plurality of complex template values associated with a plurality of preamble symbols is described. Each complex template value of the plurality of complex template values includes a real part and an imaginary part. The wireless device includes processing circuitry configured to quantize the real part and the imaginary part of each complex template value associated with the plurality of preamble symbols to a template index value comprising one of a negative one, a zero, and a positive one, for each frequency offset index, determine a plurality of non-zero template index values based on the quantized real part and the imaginary part of each complex template value, receive a signal comprising a plurality of samples, where the plurality of samples includes a plurality of sample subsets, perform a plurality of first sums, where each first sum sums a sample subset of plurality of sample subsets, assign the plurality of non-zero template index values to the plurality of first sums, where a non-zero template index value of the plurality of non-zero template index values is assigned to a corresponding first sum of the plurality of first sums, and perform a transposition of each first sum using the assigned non-zero template index value. The processing circuitry is further configured to perform a second sum, the second sum being a complex weighted sum of the transposition of each first sum and determine that the received signal comprises the OFDM long preamble based on the complex weighed sum.

In some embodiments, the processing circuitry is further configured to delay the received signal, the delayed signal being associated with a tap delay line having a predetermined length and being used to perform the plurality of first sums.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 3 is a table 300 that may be used to illustrate the process of quantizing of the correlation pattern, as described by equation (7), for the 32 samples of the sequence waveform $\{s_{2,n}\}$;

FIG. 4 is a table showing the template indices, $$\mathcal{M}_1^{(32,k)} \text{ to } \mathcal{M}_8^{(32,k)},$$

Figure 6:
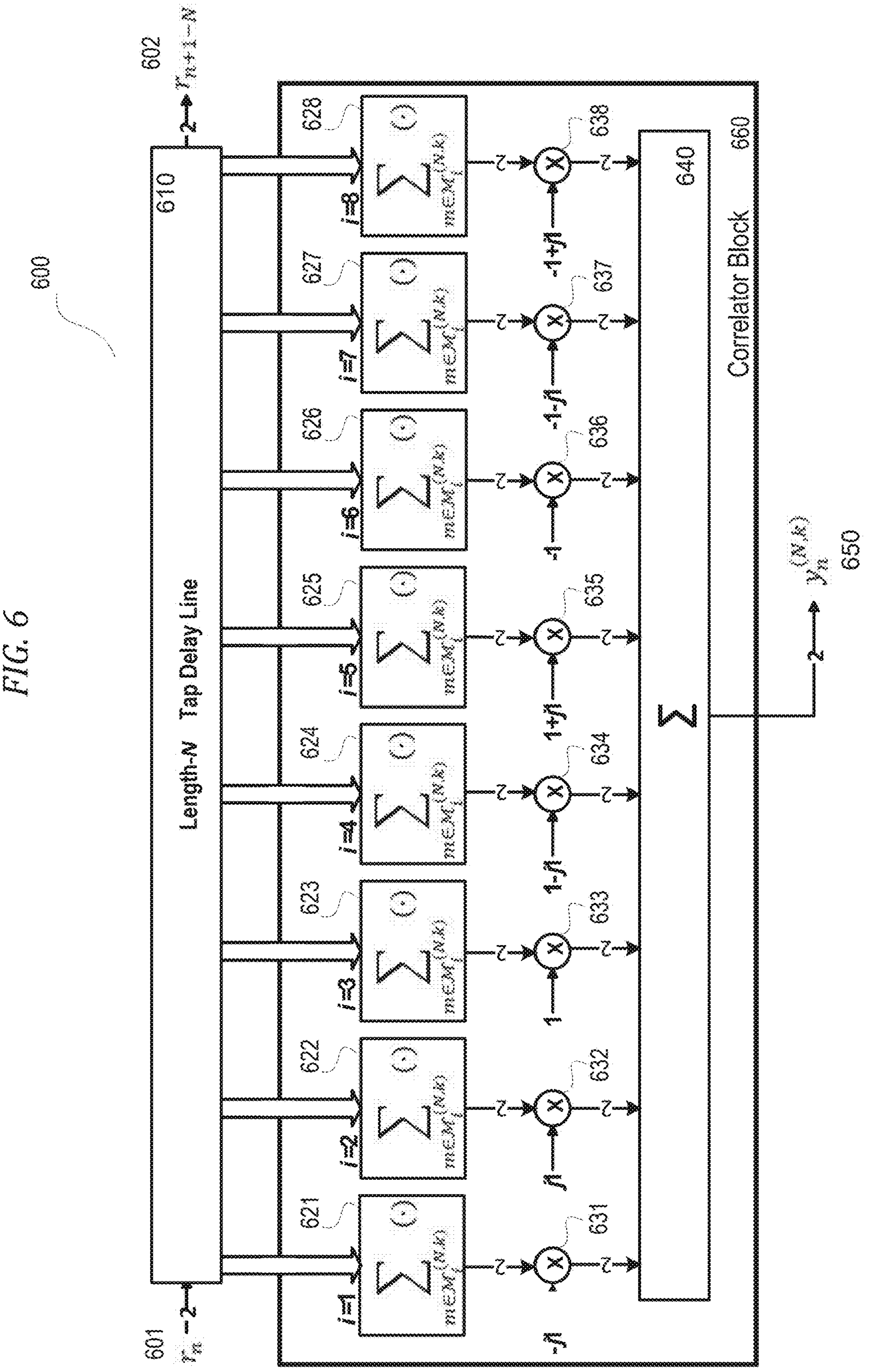
Figure 7:
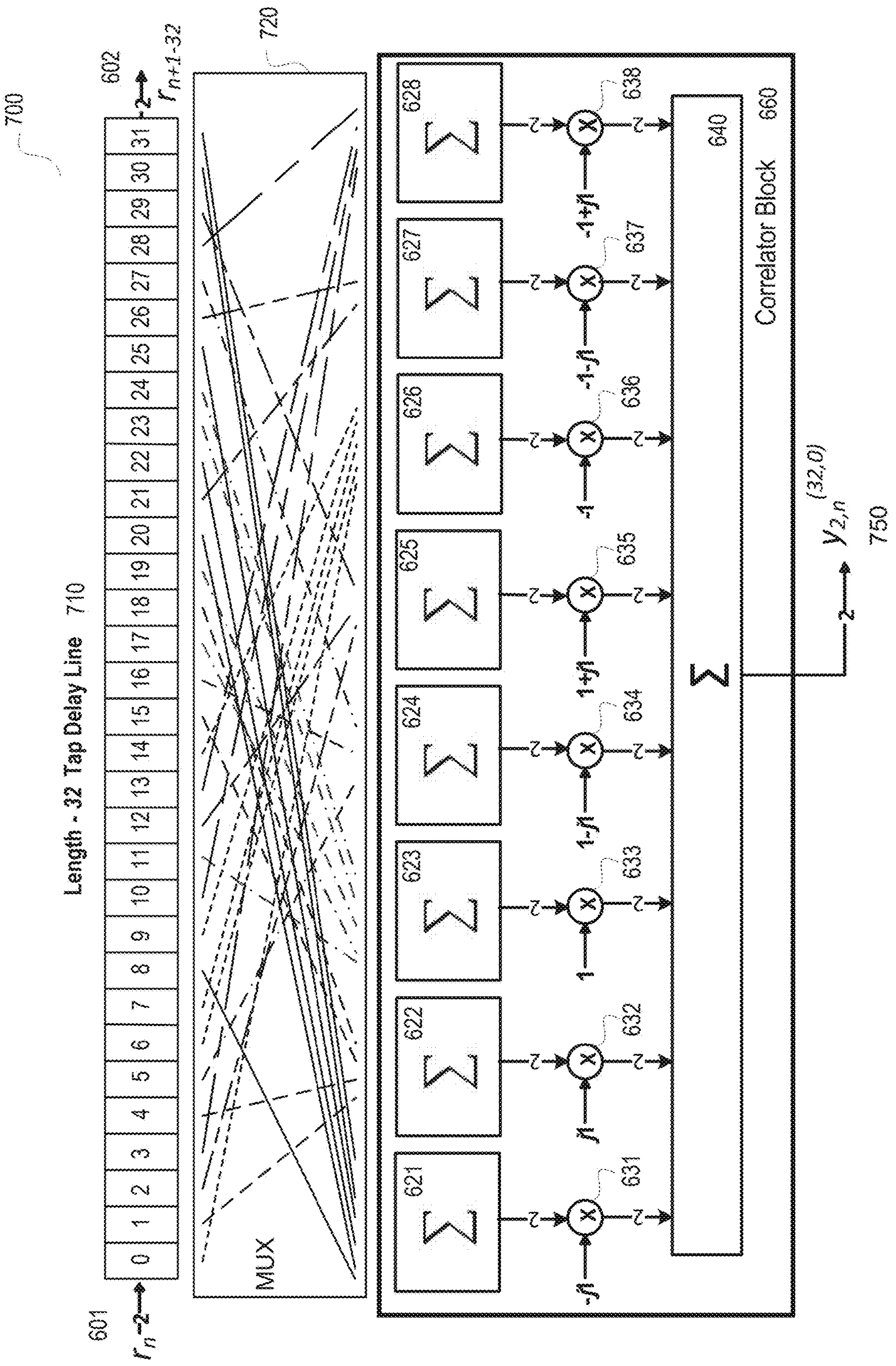
Figure 9:
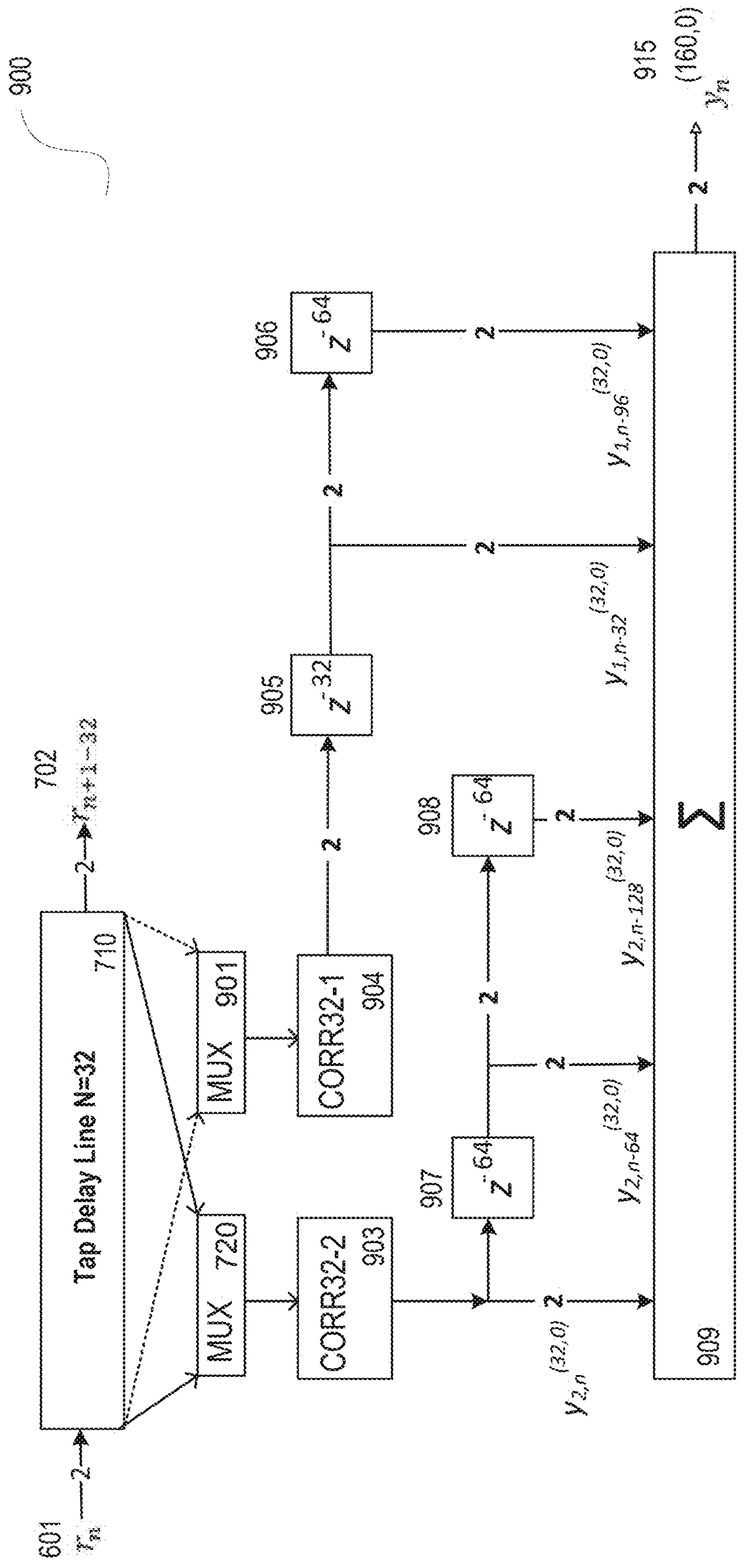
Figure 10:
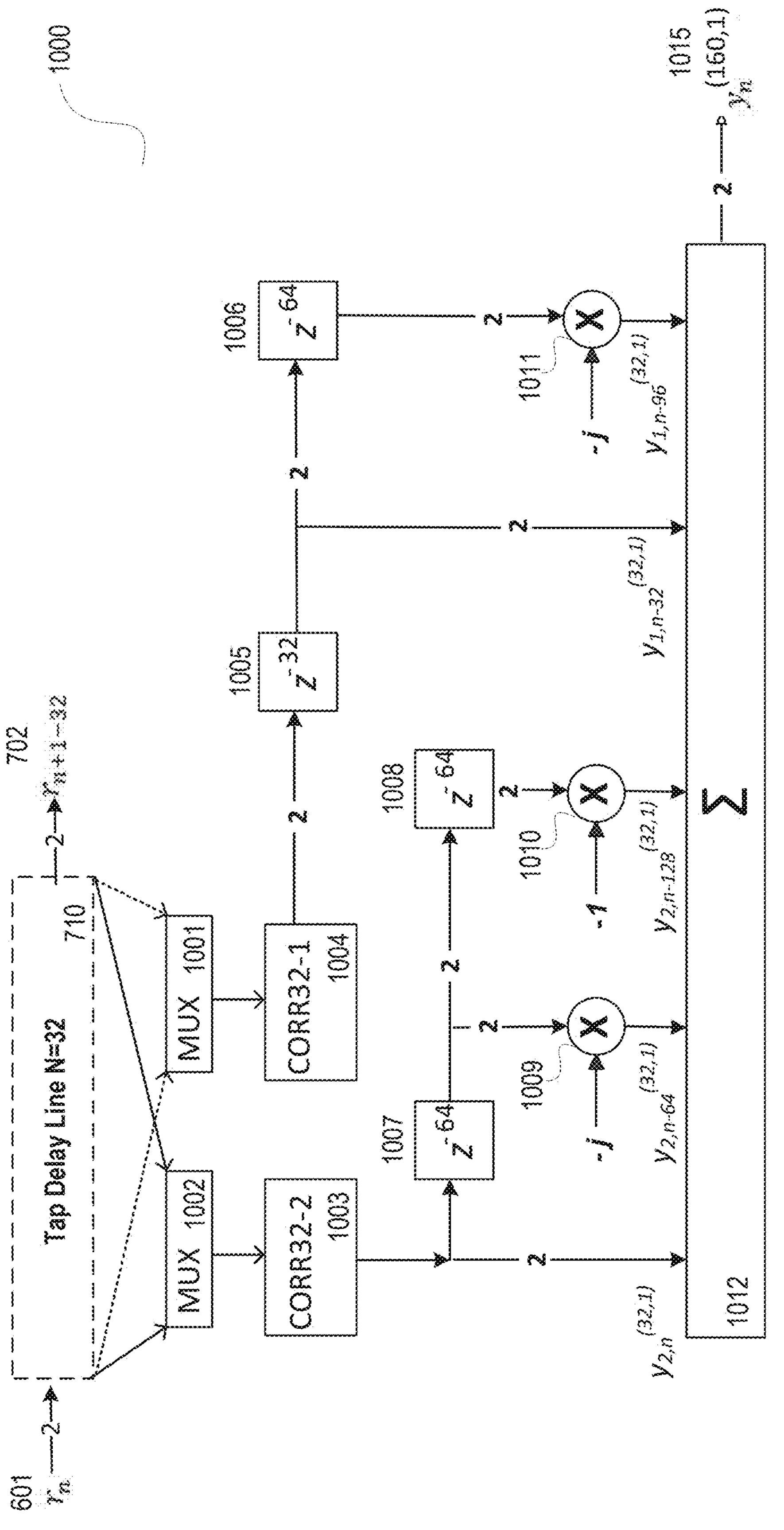
Figure 11:
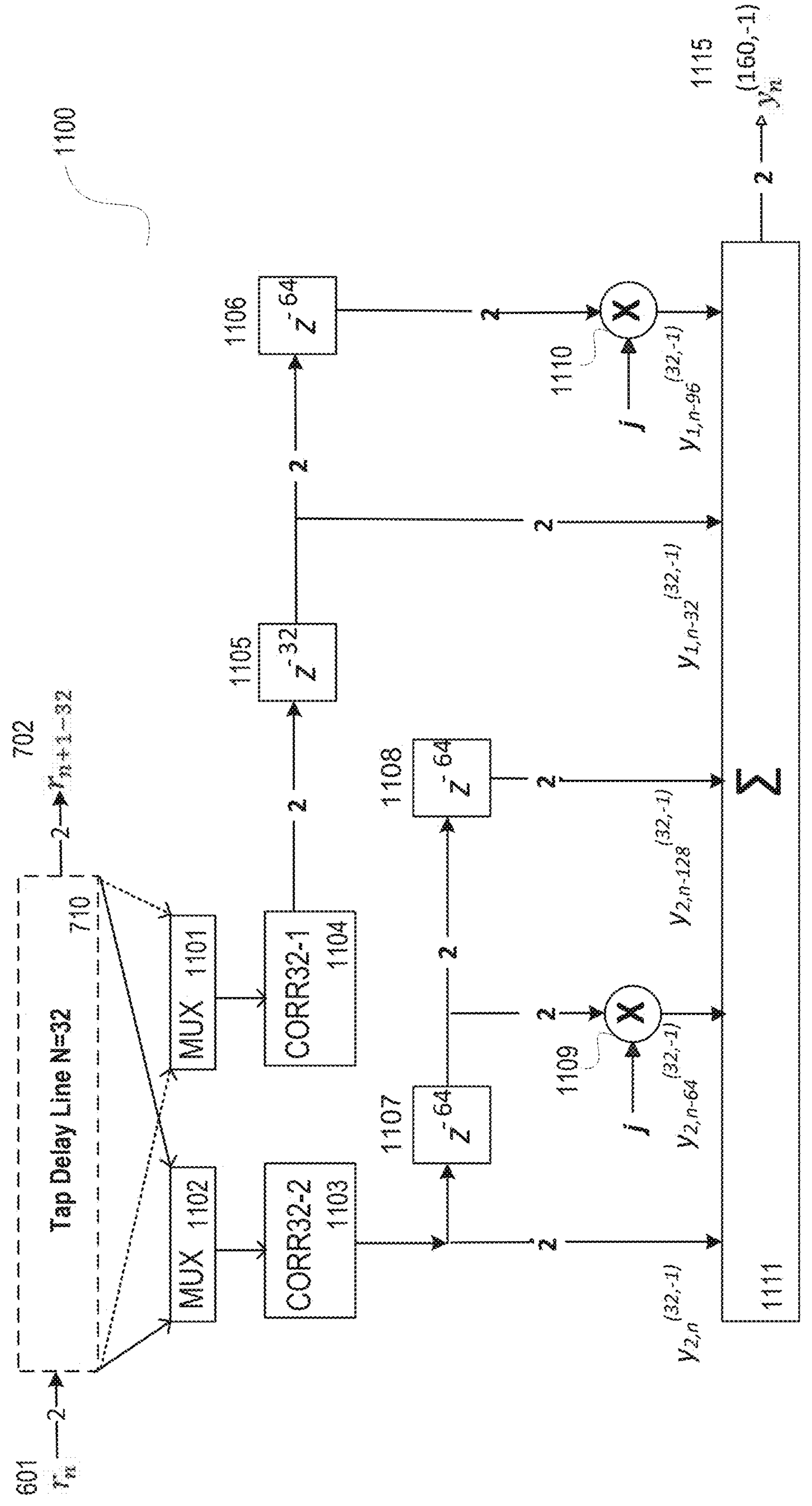
Figure 12:
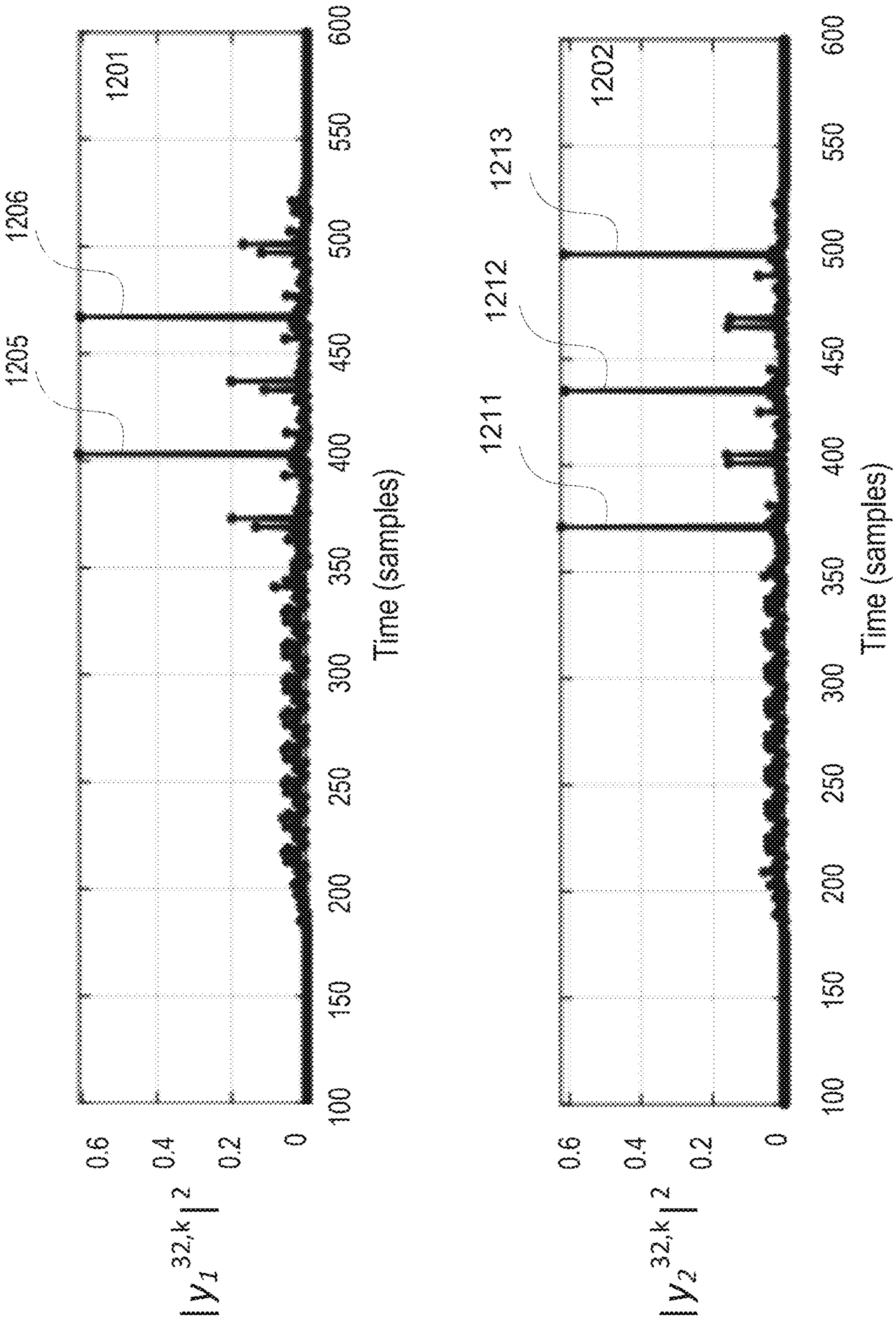
Figure 13:
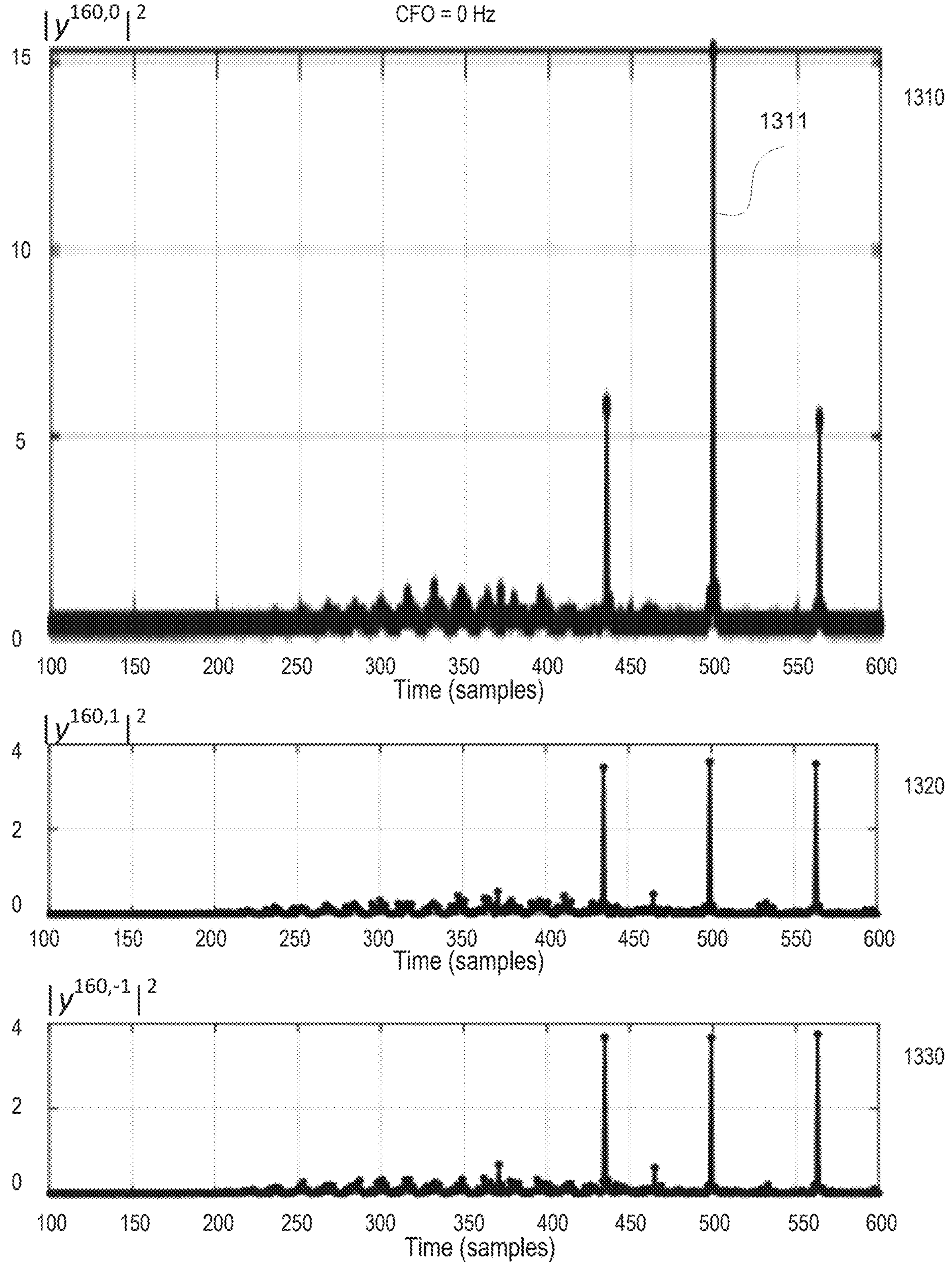
Figure 14:
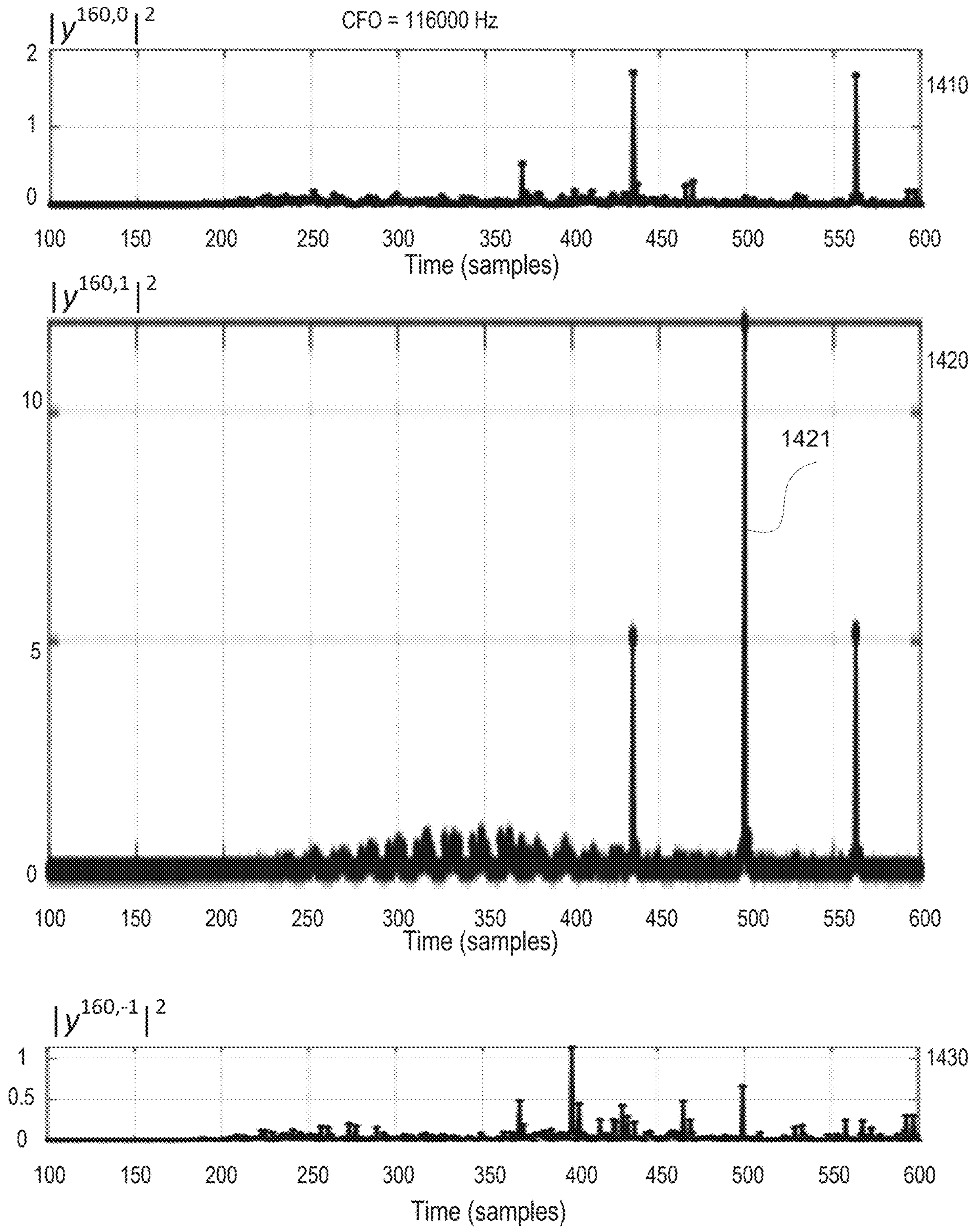
Figure 15:
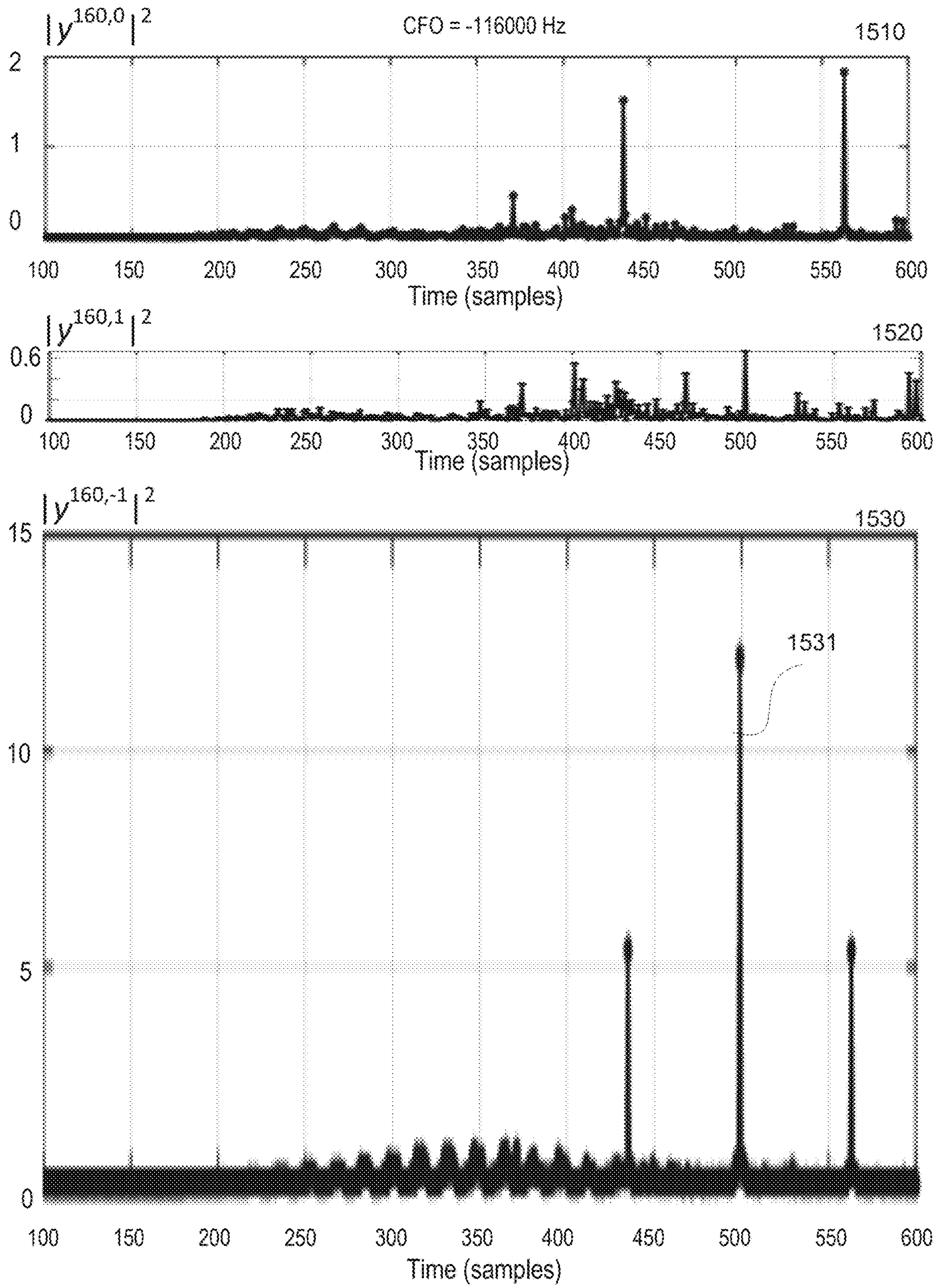
Figure 16:
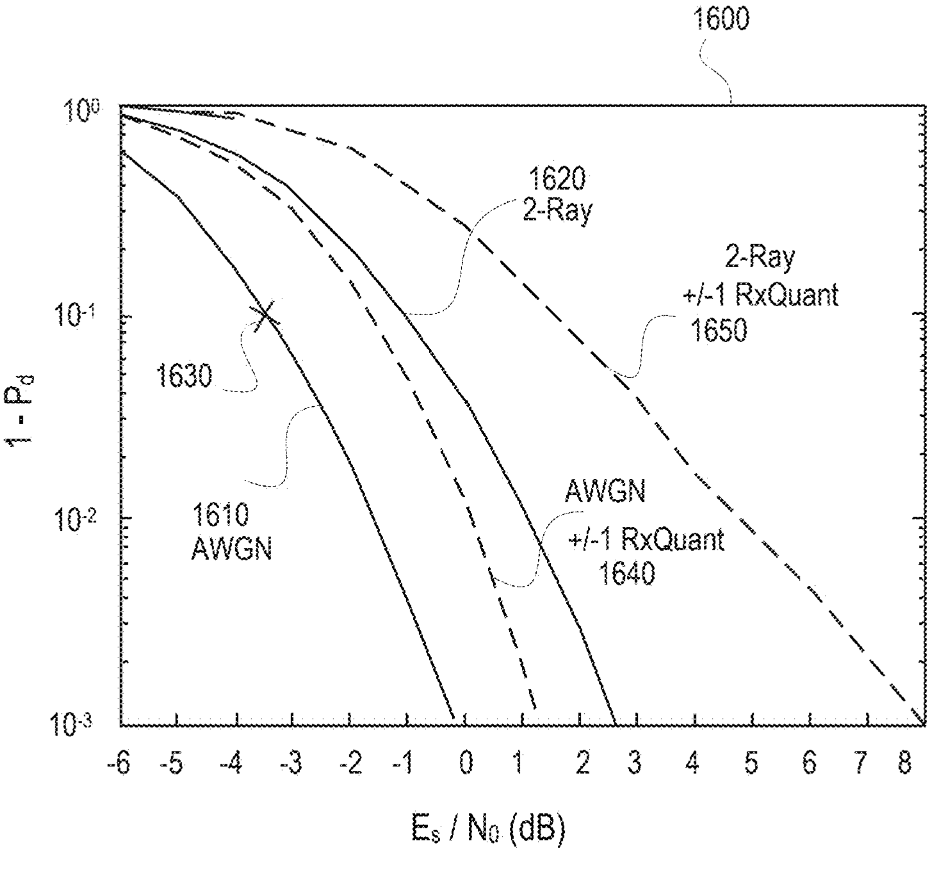
Figure 17:
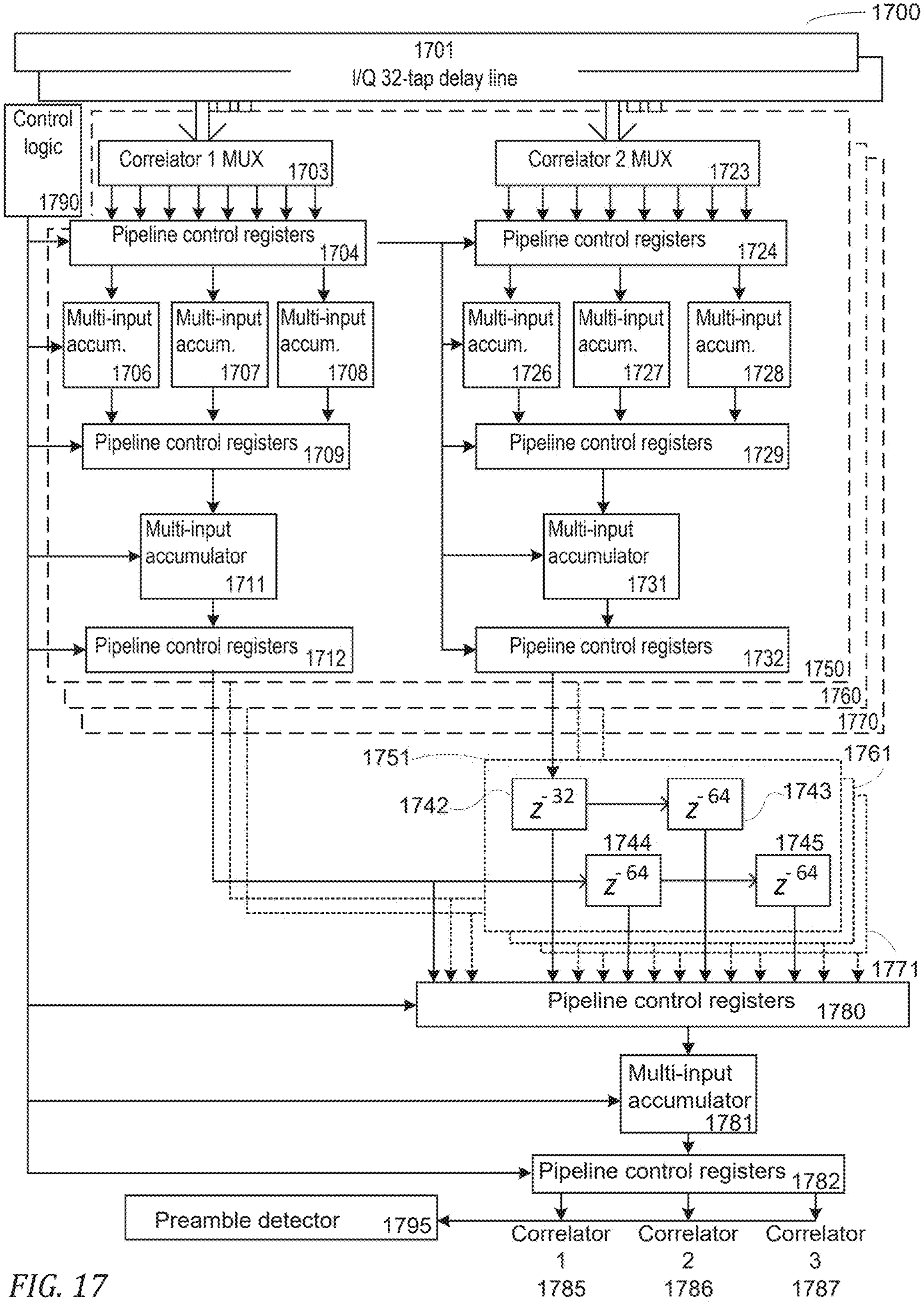
Figure 18:
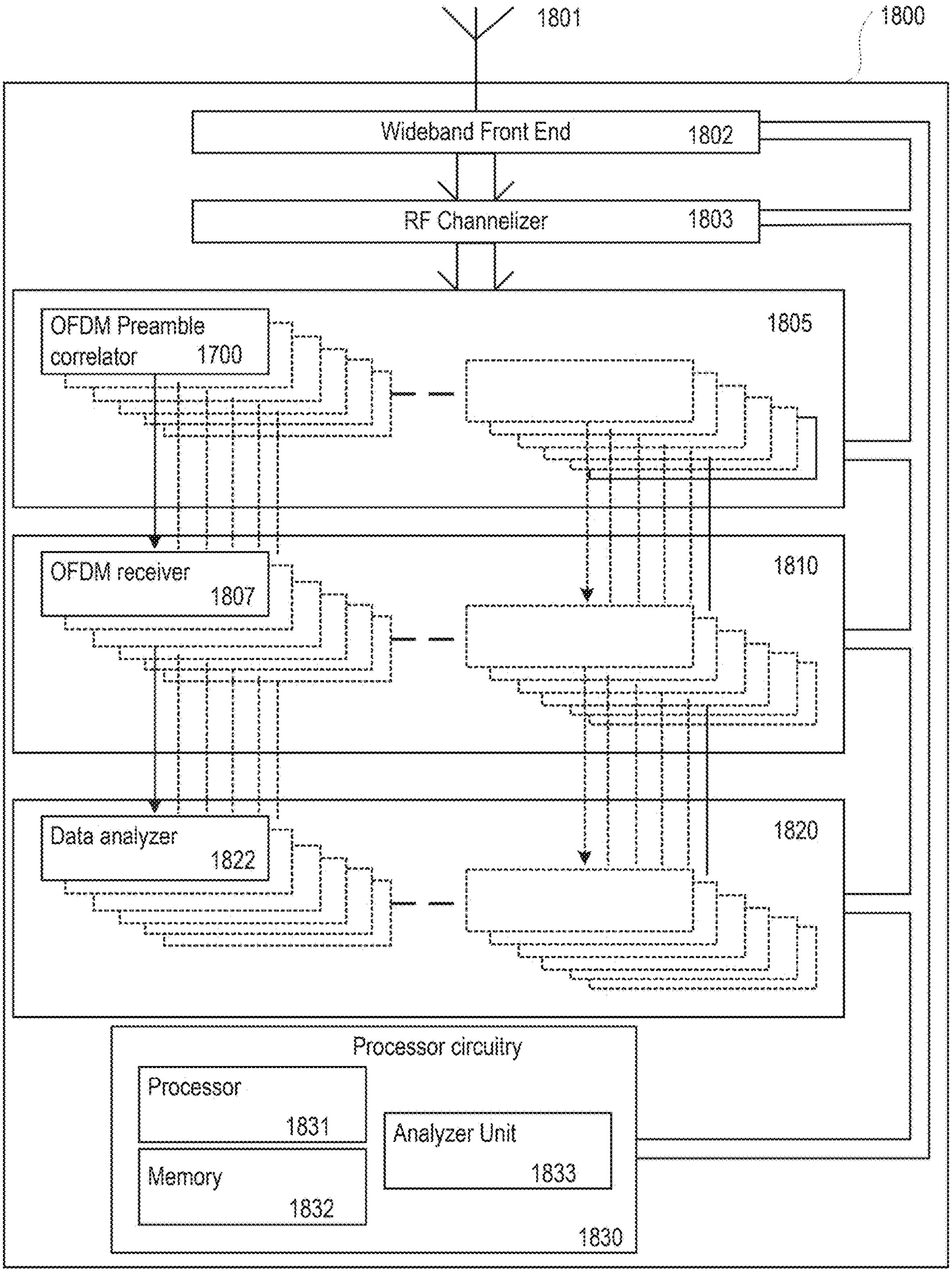
Figure 19:
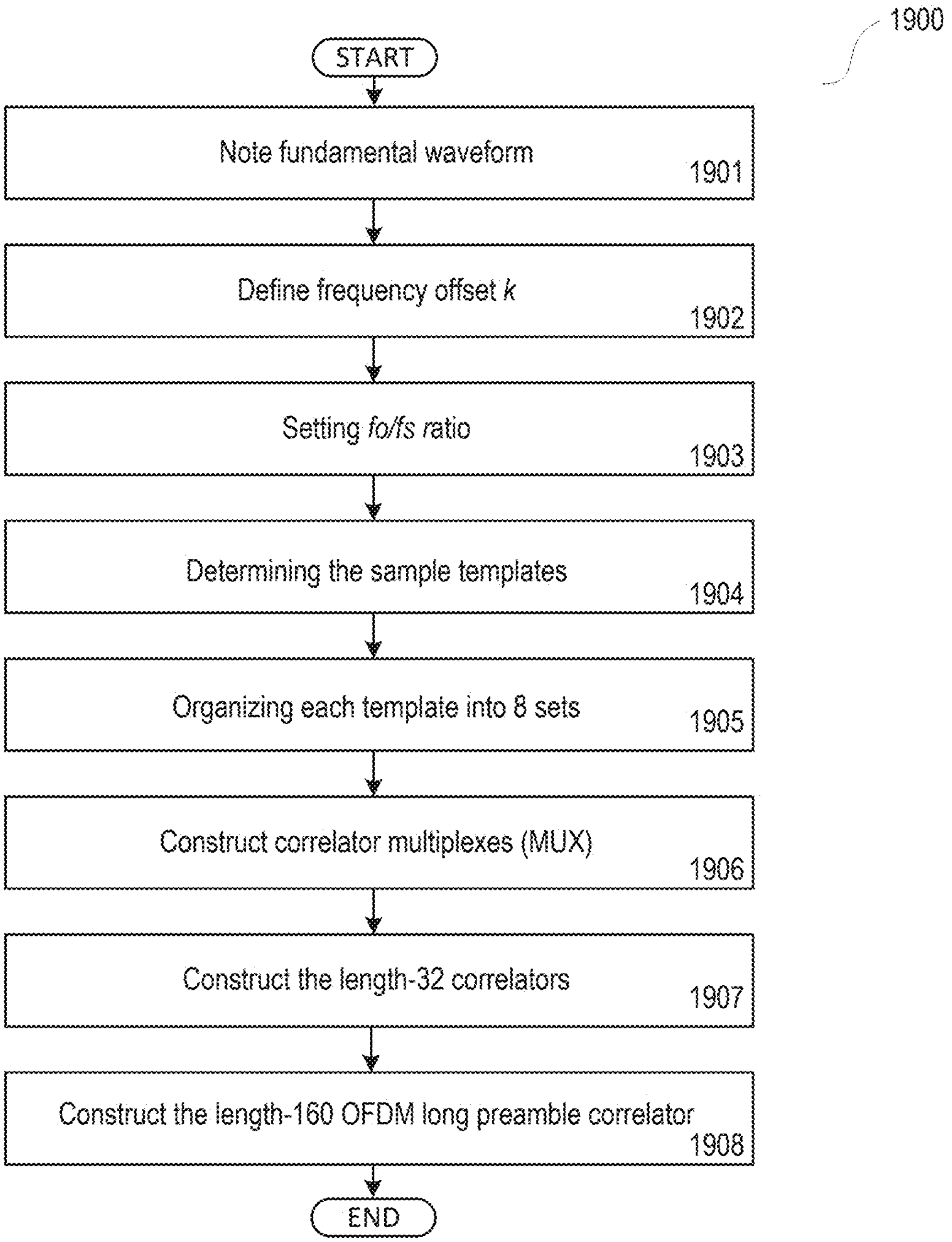

for the sequence waveform $\{s_{2,n}\}$;

FIG. 5 is a table showing the template indices, $$\mathcal{M}_1^{(32,k)}$$

to for the sequence waveform $\{s_{2,n}\}$;

FIG. 6 is a block schematic diagram example of a correlator corresponding to the real time correlation signal $$y_n^{(N,k)}$$

as described in equation (10);

FIG. 7 is a block schematic diagram of an example of a length-32 correlator for the 32 samples of the sequence waveform $\{s_{2,n}\}$;

FIG. 8 is a table that may be used to illustrate the process of quantizing, as described by equation (7), for the 32 samples of the sequence waveform $\{s_{2,n}\}$ for frequency offset index k=1;

FIGS. 9, 10, and 11 is a block schematic diagram of an example of a complete correlation structure for a dual length-32 correlator, as per equation (14) with k=−1, 0, 1;

FIG. 12 depicts a graphical example of the outputs from the two length-32 correlator blocks in correlator structure, for a received signal $r_n$ at 10 dB SNR;

FIG. 13 is an example of the graphical representation of the three summation outputs from the correlator structures, for an input signal rn with a CFO=0 Hz;

FIG. 14 is an example of the graphical representation of the three summation outputs from the correlator structures, for an input signal rn with a CFO=116000 Hz;

FIG. 15 is an example of the graphical representation of the three summation outputs from the correlator structures, for an input signal rn with a CFO=−116000 Hz;

FIG. 16 is a graph of an example of the performance curves showing the probability of missed long preamble detection $1-P_d$ versus symbol-energy-to-noise-density ratio $E_s/N_o$ for the dual, length-32 correlator structure;

FIG. 17 is a schematic diagram of an example of apparatus that may be used to implement an OFDM preamble correlator;

FIG. 18 is a block diagram of an example of a network traffic analyzer that may be used to monitor OFDM signals across a wide band;

FIG. 19 is an example flowchart of the steps of a method to construct the disclosed OFDM long preamble correlator; and FIG. 20 is an example flowchart of a method for detection of a packet (and/or packet preamble such as an OFDM packet preamble).

DETAILED DESCRIPTION

The disclosed method applies to the detection and synchronization of orthogonal frequency division multiplex (OFDM) signals, e.g., in the Wi-Fi bands.

The disclosed method significantly reduces the complexity of the required real-time complex correlations for the detection of an OFDM packet using the long training sequences of the long preamble 120. Furthermore, the disclosed method eliminates the need to correlate the short training sequences of the short preamble 110. In some embodiments, one or more actions are performed based on the detection of the OFDM packet, e.g., transmit and/or receive signaling based on the detection.

A more complete understanding of the present disclosure, and the attendant advantages and features thereof, will be more readily understood by reference to the following detailed mathematical description.

Inspection of the Standard, Table I-6 "Time domain representation of the long sequence", ignoring the window function given in I.1.3.1, shows that long preamble comprises two fundamental waveforms, which highlight its periodic nature. The long preamble may therefore be represented by these two fundamental waveforms, $\{s_{1,n}\}$ and $\{s_{2,n}\}$.

Figure 1:
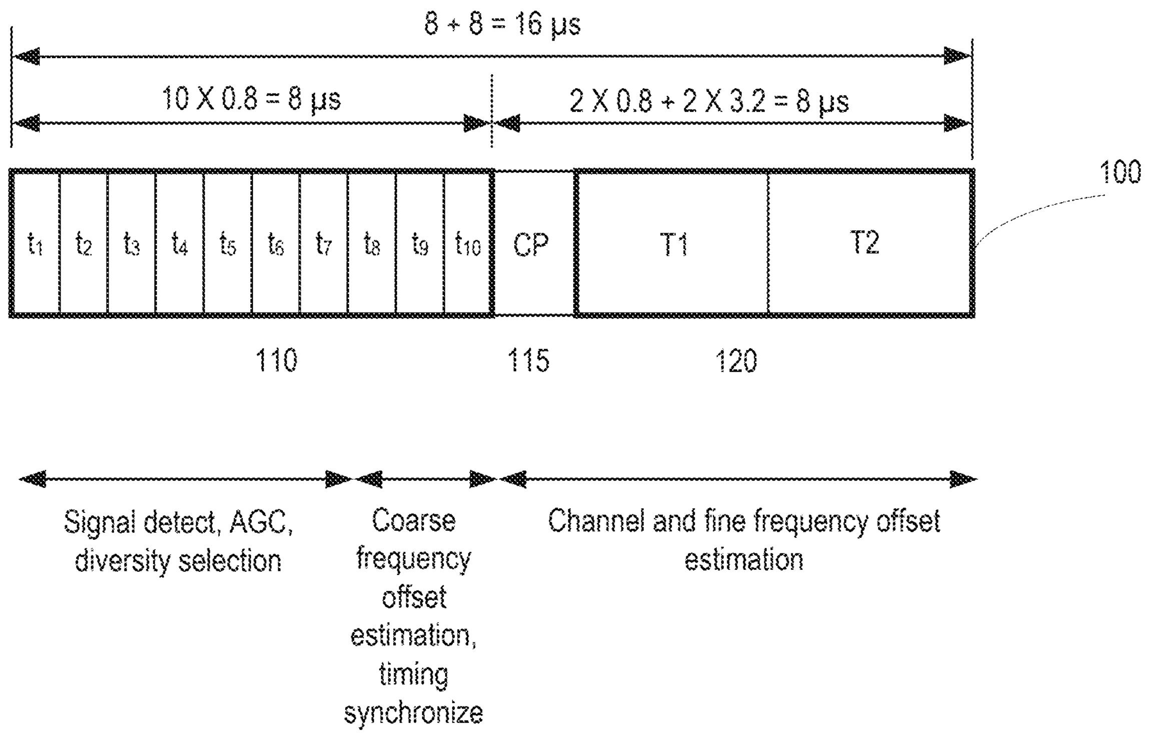
FIG. 1 is a diagram showing the structure of the OFDM Preamble field.
Figure 2:
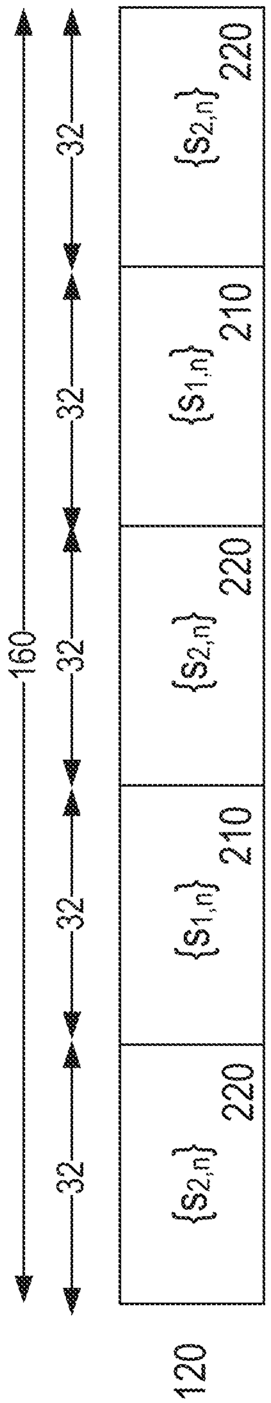
FIG. 2 is a diagram of the structure of the long preamble.

FIG. 2 is a diagram of the structure of the long preamble 120. The long preamble 120 comprises, in sequence, waveform $\{s_{2,n}\}$ 220, waveform $\{s_{1,n}\}$ 210, waveform $\{s_{2,n}\}$ 220, waveform $\{s_{1,n}\}$ 210, and waveform $\{s_{2,n}\}$ 220. For a 20 MHz sampling frequency, $f_s$, each of these two fundamental waveforms, $\{s_{1,n}\}$ 210 and $\{s_{2,n}\}$ 220 comprise length 32 complex samples.

Let $$\{w_m^{(N,k)}\}|_{m=0}^{N-1}$$

be the length-N set of complex, long preamble signal template values at frequency offset index k∈[−K,K].

The unquantized length-32 (N=32) templates, $$w_{1,m}^{(32,k)}$$

and $$w_{2,m}^{(32,k)},$$

for the preamble signals $\{s_{1,n}\}$ 210 and $\{s_{2,n}\}$ 220 respectively, at frequency offset index k are given by:

$$\text{for } m=0,1,\ldots,31,\ w_{2,m}^{(32,k)}=\exp\left(j\frac{2\pi f_0 km}{f_s}\right)\cdot s_{2,m} \quad (5)$$

$$w_{1,m}^{(32,k)}=\exp\left[j\frac{2\pi f_0 k(m+32)}{f_s}\right]\cdot s_{1,m} \quad (6)$$

where $f_0$=frequency offset step size, Hz and $f_s$=sampling frequency, Hz.

The unquantized, length-64 template $$\{w_m^{(64,k)}\}$$

for the aggregated preamble signals $\{s_{1,n}\}$ 210 and $\{s_{2,n}\}$ 220, at frequency offset k is formed by concatenating the unquantized templates $$\{w_{1,m}^{(32,k)}\}$$

and $$\{w_{2,m}^{(32,k)}\},$$

equations (5) and (6).

In order to facilitate efficient implementation of the long preamble correlation, the real and imaginary parts may be quantized to a 2-bit, sign-magnitude representation, $$w_m^{(N,k)}.$$

The terms "real" and "imaginary" are used so as to make the mathematics clear but it should be understood that the terms real and imaginary may also be referred to as the in-phase and quadrature parts respectively.

Without loss of generality, a method that may be selected for quantizing the real and imaginary part of a given template value, $$w_m^{(N,k)},$$

is:

$$\mathrm{Re}\left[w_m^{(N,k)}\right] \text{ or } \mathrm{Im}\left[w_m^{(N,k)}\right]=\mathrm{sign}(x_m)\cdot\min\left\{\left\lfloor\frac{|x_m|}{\sigma_x}+0.5\right\rfloor,1\right\} \quad (7)$$

where $x_m$ is the real or imaginary part.

$$\mathrm{sign}(x)=\begin{cases}+1 & x\geq 0\\ -1 & x<0\end{cases}$$

and $\sigma_x$ is the standard deviation of the aggregated real and imaginary parts of the aggregated signals $\{s_{1,n}\}$ 210 and $\{s_{2,n}\}$ 220.

FIG. 3 is a table 300 that may be used to illustrate the process of quantizing of the correlation pattern, as described by equation (7), for the 32 samples of the sequence waveform $\{s_{2,n}\}$ 220 for frequency offset index k=0. The samples 0 to 15 are shown in line 301, and the samples 16 to 31 are shown in line 311. The respective values of the real and imaginary parts of the samples are given in lines 302, 303 and 312, 313. The standard deviation of the real and imaginary sample values, i.e. the real values in lines 302 and 312, and the imaginary values in lines 303 and 313, are both 0.080, 310. Lines 304 and 314 give the respective quantized values, for the real part, for each sample, given by equation (7). Lines 305 and 315 give the respective quantized values, for the imaginary part, for each sample, given by equation (7). For example, consider sample 8, 320. The real part of the sequence waveform for sample 8 is −0.035, and the imaginary part is 0.151. Applying equation (7)

The real quantized value is $$\mathrm{Re}\ w_m^{(7,0)}=-\min\left\{\left\lfloor\frac{|0.035|}{0.08}+0.5\right\rfloor,1\right\}=0$$

And the imaginary quantized value $$\operatorname{Im} w_m^{(7,0)} = -\min\left\{\left\lfloor \frac{|0.151|}{0.08} + 0.5 \right\rfloor, 1\right\} = 1$$

The possible quantized 2-bit, sign-magnitude representation, $w_m^{(N,k)}$ values, are:

$$w_m^{(N,k)} \in \{0+j0, 0+j1, 0-j1, 1+j0, 1+j1, 1-j1, -1+j0, -1+j1, -1-j1\} \quad (8)$$

From equation (8), the set of indices corresponding to each of the eight possible non-zero template values, $\mathcal{M}^{(N,k)}$, for a given length N and offset k, are:

$$\begin{aligned} \mathcal{M}_1^{(N,k)} &= \{m : w_m^{(N,k)} = 0 + j1\} \quad (9) \\ \mathcal{M}_2^{(N,k)} &= \{m : w_m^{(N,k)} = 0 - j1\} \\ \mathcal{M}_3^{(N,k)} &= \{m : w_m^{(N,k)} = 1 + j0\} \\ \mathcal{M}_4^{(N,k)} &= \{m : w_m^{(N,k)} = 1 + j1\} \\ \mathcal{M}_5^{(N,k)} &= \{m : w_m^{(N,k)} = 1 - j1\} \\ \mathcal{M}_6^{(N,k)} &= \{m : w_m^{(N,k)} = -1 + j0\} \\ \mathcal{M}_7^{(N,k)} &= \{m : w_m^{(N,k)} = -1 + j1\} \\ \mathcal{M}_8^{(N,k)} &= \{m : w_m^{(N,k)} = -1 - j1\} \end{aligned}$$

FIG. 4 is a table showing the template indices, $$\mathcal{M}_1^{(32,0)} \text{ to } \mathcal{M}_8^{(32,0)},$$

for the sequence waveform $\{s_{2,n}\}$ 220. As discussed above with reference to FIG. 2. for the long preamble 120, sequence waveform $\{s_{2,n}\}$ 220 comprises sample sets 0 to 31, 64 to 95, and 128 to 159. These three sets of samples are shown in Table 400, "Samples" 401. Line 411 of table 400 corresponds to the template index $\mathcal{M}_1$, 0+j1 and an "X" in the column under a sample shows that those samples have that index. For example, samples 8, 20, 22, 25, 30, and 31 of each $\{s_{2,n}\}$ 220 sequence, have the template index $\mathcal{M}_1$, 0+j1. Similarly, lines 412 to 418 correspond to the template indices $\mathcal{M}_2$ to $\mathcal{M}_8$ respectively and the samples that have the respective index.

FIG. 5 is a table showing the template indices, $$\mathcal{M}_1^{(32,0)} \text{ to } \mathcal{M}_8^{(32,0)},$$

for the sequence waveform $\{s_{1,n}\}$ 210. As discussed above with reference to FIG. 2 for the long preamble 120, sequence waveform $\{s_{1,n}\}$ 210 comprises sample sets 32 to 63, and 96 to 127. These two sets of samples are shown in Table 500, "Samples" 501. Line 511 of table 500 corresponds to the template index $\mathcal{M}_1$, 0+j1 and an "X" in the column under a sample shows that those samples have that index. It may be noted that samples 46/110, 49/113, 60/124, and 63/127 have the template index $\mathcal{M}_1$, 0+j1 which corresponds to samples 14, 17, 28 and 31 of each $\{s_{2,n}\}$ 220 sequence. Similarly, lines 512 to 518 correspond to the template indices $\mathcal{M}_2$ to $\mathcal{M}_8$ respectively and the samples that have the respective index.

For a complex received signal $\{r_n\}$, the real time correlation signal $$y_n^{(N,k)}$$

is:

$$\begin{aligned} y_n^{(N,k)} &= \sum_{m=0}^{N-1} \left[w_m^{(N,k)}\right]^* r_{n+m+1-N} \quad (10) \\ &= (-j1) \sum_{m \in \mathcal{M}_1^{(N,k)}} r_{n+m+1-N} + (j1) \sum_{m \in \mathcal{M}_2^{(N,k)}} r_{n+m+1-N} \\ &\quad + (1) \sum_{m \in \mathcal{M}_3^{(N,k)}} r_{n+m+1-N} + (1 - j1) \sum_{m \in \mathcal{M}_4^{(N,k)}} r_{n+m+1-N} \\ &\quad + (1 + j1) \sum\nolimits_{m \in \mathcal{M}_5^{(N,k)}} r_{n+m+1-N} + (-1) \sum\nolimits_{m \in \mathcal{M}_6^{(N,k)}} r_{n+m+1-N} \\ &= (-1 - j1) \sum\nolimits_{m \in \mathcal{M}_7^{(N,k)}} r_{n+m+1-N} + (-1 + j1) \sum\nolimits_{m \in \mathcal{M}_8^{(N,k)}} r_{n+m+1-N} \end{aligned}$$

FIG. 6 is a block schematic diagram example of a correlator 600 corresponding to the real time correlation signal $$y_n^{(N,k)}$$

as described in equation (10). Correlator 600 comprises a length-N complex tap delay line 610, and a correlator block 660. The complex received signal $r_n$ 601 is passed through the length-N complex tap delay line 610 such that the output 602 of the delay line 610 is $r_{n+1-N}$. The correlator block 660 comprises eight pre-adder sections, 621 to 628, eight multipliers 631 to 638, and a summation block 640. The eight pre-adders, 621 to 628 are connected to the tap-delay line 610, each pre-adder having connections to multiple taps. Each pre-adder has a value $$\sum\nolimits_{m \in \mathcal{M}_i^{(N,k)}} r_{n+m+1-N},$$

as described in equation (10), where i=1 for pre-adder 621, i=2 for pre-adder 622, i=3 for pre-adder 623, i=4 for pre-adder 624, i=5 for pre-adder 625, i=6 for pre-adder 326, i=7 for pre-adder 327, and i=8 for pre-adder 628. The output of pre-adders 621 through 628 are inputted to multipliers 631 through 638 respectively. The other input to the multipliers 631 through 638 are the complex conjugates of $$w_m^{(N,k)}$$

for the respective pre-adder terms in equation (10) and the outputs of the 8 multipliers are then summed in summation block 640. The output 650 is then $$y_n^{(N,k)}$$

as per equation (10). It may be noted that although the term "multiplier" has been applied to multipliers 631 to 638, their action is simply one of transposing, simple sign adjustment or cross-adding. For example, consider multiplier 631 where the output of the pre-adder 621 is of the form (a+jb). Multiplying by −j1 results in −j(a+jb)=(b−ja), i.e., a transposition. Hence, each of the 'multipliers' 631 to 638 do not actually require any true multiplication but can be implemented by simple transposition, sign adjustment or cross-adding. Thus, the correlator as described by equation (10) does not involve any actual multiplications.

FIG. 7 is a block schematic diagram of an example of a length-32 correlator for the 32 samples of the sequence waveform $\{s_{2,n}\}$ 220 for k=0. From equation (5), if k=0 then:

$$w_{2,m}^{(32,k)} = \exp\left(j\frac{2\pi f_0 km}{f_s}\right)\cdot s_{2,m} = \exp(j^0)\cdot s_{2,m} = s_{2,m} \tag{11}$$

FIG. 7 is a special case of the correlator in FIG. 6 where the length-N complex tap delay line 610 is replaced by a length-32 complex tap delay line 710 to form correlator 700. The multiplexing of the connections MUX 720 from the tap delay line 710 to the individual per-adders, 621 to 628 correspond to the connections as shown in FIG. 4. For example, the connections to pre-adder 621, which corresponds to the term $$\sum\nolimits_{m\in M_1^{(N,k)}} r_{n+m+1-N}$$

in equation (10), are taps 8, 20, 22, 25, 30 and 31 within MUX 720, corresponding to the respective samples of the sequence waveform $\{s_{2,n}\}$ 220, as shown in line 411 of FIG. 4. Similarly the connections to pre-adder 622, which corresponds to the term $$\sum\nolimits_{m\in M_2^{(N,k)}} r_{n+m+1-N}$$

in equation (10), are taps 1, 4, 15, and 18, within MUX 720, corresponding to the respective samples of the sequence waveform $\{s_{2,n}\}$ 220, as shown in line 412 of FIG. 4. The output 750 from the correlator block 660 is $$y_{2,n}^{(32,0)}.$$

An example of a length-32 correlator for the 32 samples of the sequence waveform $\{s_{1,n}\}$ 210 for k=0 would be similar to that shown in FIG. 7, but the connections from the length-32 tap delay line 710 to the pre-adders 621 to 628 in the MUX would now correspond to the connections indicated in FIG. 5. For example the connections to pre-adder 621, which corresponds to the term $$\sum\nolimits_{m\in M_1^{(N,k)}} r_{n+m+1-N}$$

in equation (10), are taps 14, 17, 28, and 31 corresponding to the respective samples, 46, 49, 60 and 63 of the sequence waveform $\{s_{1,n}\}$ 210, as shown in line 511 of FIG. 5. Similarly the connections to pre-adder 622, which corresponds to the term $$\sum\nolimits_{m\in M_2^{(N,k)}} r_{n+m+1-N}$$

in equation (10), are taps 1, 2, 7, 10, 12, and 24, corresponding to the respective samples 33, 34, 39, 42, 44, and 56, of the sequence waveform $\{s_{2,n}\}$ 220, as shown in line 512 of FIG. 5.

From equation (5), if k=1 then $$w_{2,m}^{(32,1)} = \exp\left(j\frac{2\pi f_0 m}{f_s}\right)\cdot s_{2,m}$$

Choosing a value of $f_0$=78125 Hz, for $f_s$=20 $10^6$ Hz, such that $f_0/f_s$=1/256:

$$w_{2,m}^{(32,1)} = \exp\left(j\frac{\pi m}{128}\right)\cdot s_{2,m} \tag{12}$$

FIG. 8 is a table 800 that may be used to illustrate the process of quantizing, as described by equation (7), for the 32 samples of the template $$w_{2,m}^{(32,1)}$$

for frequency offset index k=1. The samples 0 to 15 are shown in line 801, and the samples 16 to 31 are shown in line 810. The respective values of the real parts of the sequence waveform $\{s_{2,n}\}$ 220 are given in lines 802 and 811 and the respective values of the imaginary parts of the sequence waveform $\{s_{2,n}\}$ 220 are given in lines 803 and 812. The real and imaginary parts of the offset, exp $$\left(j\frac{\pi m}{128}\right)$$

are given in rows 804 and 805 respectively, for samples 0 to 15, and in rows 813 and 814 respectively, for samples 16 to 31. The real and imaginary parts of the product, exp $$\left(j\frac{\pi m}{128}\right)\cdot s_{2,m},$$

are given in rows 806 and 807 respectively for samples 0 to 15 and in rows 815 and 816 respectively for samples 16 to 32.

For example, in order to determine the value of each sample for k=1, equation (12) is used. For example, the calculations for sample 8 are as follows:

$$s_{2,8} = -0.035 + j0.151$$

$$\exp\left(j\frac{\pi 8}{128}\right) = 0.981 + j0.195$$

Hence, $$\exp\left(j\frac{\pi 8}{128}\right) \cdot s_{2,8} = -.028 + j0.141$$

Lines 808 and 809 give the real part of the respective quantized values for each product, as given by equation (7), for samples 0 to 15 and lines 817 and 818 give the respective quantized values, for the imaginary part, for each product, given by equation (7) for samples 16 to 31. The corresponding template indices are given in rows 830 and 831. For example, for sample 8, the quantized value of the product is 0, 1 which has the corresponding template index $$\mathcal{M}_1^{(N,k)}$$

as shown in equation (9).

Table 800 provides the information of the taps from the correlator block 660 to the length-32 tap delay line 710, for a length-32 correlator for k=1, providing the output $y_2^{(32,1)}$. The steps for the tap connections for a length-32 correlator for k=−1 are similar to those described above with reference to FIG. 8 but where the offset is exp $$\left(j\frac{-\pi m}{128}\right),$$

providing the output $y_2^{(32,-1)}$. The calculations for the 32-length correlators for $y_1^{(32,-1)}$ and $y_1^{(32,-1)}$ are similar to those described above with reference to FIG. 8.

The correlation as per equation (10) may be computed against the entire length-160 long preamble signal, $$y_n^{(160,k)}.$$

Taking into account a frequency offset index k∈[−K, K], the correlation $$y_n^{(160,k)}$$

may be expressed as follows:

$$y_n^{(160,k)} = y_n^{(64,k)} + e^{j2\pi \cdot 64 \cdot f_0 k/f_s} \cdot y_{n-64}^{(64,k)} + e^{j2\pi \cdot 128 \cdot f_0 k/f_s} \cdot y_{2,n-128}^{(32,k)} \tag{13}$$

where $$y_n^{(64,k)} = \sum_{m=0}^{63} \left[w_m^{(64,k)}\right]^* r_{n+m+1-64}$$

$$y_n^{(32,k)} = \sum_{m=0}^{31} \left[w_{2,m}^{(32,k)}\right]^* r_{n+m+1-32}$$

The structure as depicted in equation (13), for each k∈[−K, K] may be realized using a length 64 correlator and a length-32 correlator, followed by a simple combining step to assemble the sub-correlations, with no requirement for multiplication.

Similarly, the correlation as per equation (10) may also be computed against the entire length-160 long preamble signal, $$y_n^{(160,k)}$$

and may be expressed as $$y_n^{(160,k)} = y_{2,n}^{(32,k)} + y_{1,n-32}^{(32,k)} + e^{j2\pi \cdot 64 \cdot f_0 k/f_s} \cdot y_{2,n-64}^{(32,k)} + e^{j2\pi \cdot 64 \cdot f_0 k/f_s} \cdot y_{1,n-96}^{(32,k)} + e^{j2\pi \cdot 128 \cdot f_0 k/f_s} \cdot y_{n-128}^{(32,k)} \tag{14}$$

where $$y_{1,n}^{(32,k)} = \sum_{m=0}^{31} \left[w_{1,m}^{(32,k)}\right]^* r_{n+m+1-32}$$

$$y_{2,n}^{(32,k)} = \sum_{m=0}^{31} \left[w_{2,m}^{(32,k)}\right]^* r_{n+m+1-32}$$

Variable j is the square root of −1 and defines the imaginary part of a complex number. Variable n is an integer number that indexes the signal. In this nonlimiting example, Yn is the nth correlator output Y. Hence, the structure as depicted in equation (14), for each k E [−K, K] may be realized using two length-32 correlators, followed by a simple combining step to assemble the sub-correlations, with no requirement for multiplication.

It may be noted from equations (13) and (14), that if 2×128 $f_0/f_s=1$ then $f_0=f_s/256$.

Thus, for a sampling frequency, $f_s=20\cdot10^6$ Hz, the frequency offset step size, $f_0=78125$ Hz.

Then, for $f_s=20\cdot10^6$ and $f_0=78125$, equation (14) becomes:

$$y_n^{(160,k)} = y_{2,n}^{(32,k)} + y_{1,n-32}^{(32,k)} + e^{j\pi k/2} \cdot y_{2,n-64}^{(32,k)} + e^{j\pi k/2} \cdot y_{1,n-96}^{(32,k)} + e^{j\pi k} \cdot y_{2,n-128}^{(32,k)} \tag{15}$$

It may be noted that a single correlator at template frequency offset index k=0, i.e., 0 Hz, has zero signal output for a preamble signal received with frequency offset $f_o$ equal to $$\pm\frac{20\cdot10^6}{160} = \pm125\text{ kHz},$$

which effectively sets the maximum frequency offset limit for template frequency offset index k=0. With reference to the Standard, Clause 17, the maximum oscillator error for an OFDM device is ±20 parts per million, which, at the highest carrier frequency of interest, 5825 MHz, corresponds to a maximum frequency error of ±116.5 kHz, assuming that the receiver which includes the correlator has a zero frequency error. A frequency error of ±116.5 kHz will not be adequately covered by a single correlator, i.e., K=0. However, the correlator bank for K=1 may be designed with template frequency offsets 78125·k for k=−1, 0, 1, thus creating a "net" for capturing the long preamble signal over the entirety of the possible frequency offset range. This correlator configuration, alone, facilitates robust packet detection, and, in effect, eliminates the need for the costly short preamble detector, altogether.

FIGS. 9, 10, and 11 are block schematic diagrams of an example of a complete correlation structure for a dual length-32 correlator, as per equation (15) with k=−1, 0, 1. FIG. 9 corresponds to k=0, FIG. 10 corresponds to k=1 and FIG. 11 corresponds to k=−1.

FIG. 9 is the block schematic diagram 900 for the dual length-32 correlator for k=0. Received complex signal $r_n$ 601 is inputted to a length-32 complex tap delay line 710 with output $r_{n+1-32}$ 702. The correlator blocks 903 and 904 are identical to the correlator block 660 in FIGS. 6 and 7. The connections MUX 720, from the tapped delay line 710 to the correlator block 903, are for the sequence waveform $\{s_{2,n}\}$ 220 and correspond to the samples as discussed above with reference to, and as shown, in FIG. 4 and also as described above with reference to FIG. 7. The connections MUX 901, from the tapped delay line 710 to the correlator block 904, are for the sequence waveform $\{s_{1,n}\}$ 210 and correspond to the samples as discussed above with reference to, and as shown, in FIG. 5. The output from correlator block 903, corresponds to the first term in equation (15) for $$k=0,\ y_{2,n}^{(32,0)},$$

and is inputted to summation block 909. The output from correlator block 904 is delayed 32 samples 905 and represents the second term in equation (15), for $$k=0,\ y_{1,n-32}^{(32,0)},$$

and is also inputted to summation block 909. The output from correlator block 903 is delayed by 64 samples 907, representing the third term in equation (15) for $$k=0,\ y_{2,n-64}^{(32,0)},$$

and is inputted to summation block 909. The delayed output from 905 is further delayed by 64 samples 906, representing the fourth term in equation (15) for $$k=0,\ y_{1,n-96}^{(32,0)},$$

and is inputted to summation block 909. The delayed output from 907 is further delayed by 64 samples 908, representing the fifth term in equation (15) for $$k=0,\ y_{2,n-128}^{(32,0)},$$

and is inputted to summation block 909. The five inputs to summation block 909 therefore are the five terms in equation (15) for k=0, and hence the output of summation block 909 is $$y_n^{(160,0)}$$

915.

FIG. 10 is the block schematic diagram for the dual length-32 correlator 1000 for k=1. The correlator blocks 1003 and 1004 are identical to the correlator block 660 in FIGS. 6 and 7. The connections MUX 1002 from the tapped delay line 710 to the correlator block 1003, are for the template $$w_{2,m}^{(32,1)},$$

and correspond to the connections as discussed above with reference to, and as shown, in FIG. 8. The connections MUX 1001 from the tapped delay line 710 to the correlator block 1004, are for the template $$w_{1,m}^{(32,1)}.$$

The output from correlator block 903, corresponds to the first term in equation (15) for $$k=1,\ y_{2,n}^{(32,1)},$$

and is inputted to summation block 1012. The output from correlator block 1004 is delayed 32 samples 1005 and represents the second term in equation (15), for $$k=1,\ y_{1,n-32}^{(32,1)},$$

and is also inputted to summation block 1012. The output from correlator block 1003 is delayed by 64 samples 1007, and then multiplied by −j in multiplier 1009, to correspond to the complex conjugate of the third term in equation (15) for $$k=1,\ -j\cdot y_{2,n-64}^{(32,1)},$$

and is inputted to summation block 1012. The delayed output from 1005 is further delayed by 64 samples 1006, and then multiplied by −j in multiplier 1011 representing the complex conjugate of the fourth term in equation (15) for $$k=1,\ -j\cdot y_{1,n-96}^{(32,1)},$$

and is inputted to summation block 1012. The delayed output from 1007 is further delayed by 64 samples 1008, and then multiplied by −1 in multiplier 1010 representing the fifth term in equation (15) for $$k=1,\ -1\cdot y_{2,n-128}^{(32,1)},$$

and is inputted to summation block 1012. The five inputs to summation block 1012 therefore are the five terms in equation (15) for k=1, and hence the output of summation block 1012 is $$y_n^{(160,1)}$$

1015.

FIG. 11 is the block schematic diagram 1100 for the dual length-32 correlator for k=−1. The correlator blocks 1103 and 1104 are identical to the correlator block 660 in FIGS. 6 and 7. The connections MUX 1102 from the tapped delay line 710 to the correlator block 1103, are for the template $$w_{2,m}^{(32,-1)}.$$

The connections MUX 1101 from the tapped delay line 710 to the correlator block 1104, are for the template $$w_{1,m}^{(32,-1)}.$$

The output from correlator block 1103, corresponds to the first term in equation (15) for $$k=-1,\ y_{2,n}^{(32-1)},$$

and is inputted to summation block 1111. The output from correlator block 1104 is delayed 32 samples 1105 and represents the second term in equation (15), for $$k=-1,\ y_{1,n-32}^{(32-1)},$$

and is also inputted to summation block 1111. The output from correlator block 1103 is delayed by 64 samples 1107, and then multiplied by j in multiplier 1109, to correspond to the complex conjugate of the third term in equation (15) for $$k=-1,\ j\cdot y_{2,n-64}^{(32,-1)},$$

and is inputted to summation block 1111. The delayed output from 1105 is further delayed by 64 samples 1106, and then multiplied by j in multiplier 1110 representing complex conjugate of the fourth term in equation (15) for $$k=-1,\ j\cdot y_{1,n-96}^{(32-1)},$$

and is inputted to summation block 1111. The delayed output from 1107 is further delayed by 64 samples 1108, representing the fifth term in equation (15) for $$k=-1,\ y_{2,n-128}^{(32,-1)},$$

and is inputted to summation block 1111. The five inputs to summation block 1111 therefore are the five terms in equation (15) for k=−1, and hence the output of summation block 1111 is $$y_n^{(160,-1)}$$

1115.

FIG. 12 depicts a graphical example of the outputs from the two length-32 correlator blocks 903 and 904 in correlator structure 900, for a received signal $r_n$ at 10 dB SNR. Graph 1201 is an example of the output from correlator block 904 and plots the magnitude of the complex output $$|y_1^{32,0}|^2$$

against time (samples). Graph 1202 is an example of the output from correlator block 903 and plots the magnitude of the complex output $$|y_2^{32,0}|^2,$$

against time (samples). Graphs 1201 and 1202 are the outputs for the samples of the sequence waveforms $\{s_{1,n}\}$ 210 and $\{s_{2,n}\}$ 220 respectively. As discussed above with reference to FIG. 2, the 160 samples of the long preamble comprise two sets of sequence waveform $\{s_{1,n}\}$ 210 and three sets of sequence waveform $\{s_{2,n}\}$ 220. Graph 1201 shows the expected 2 correlations, 1205 and 1206, for waveform $\{s_{1,n}\}$ 210 and graph 1202 shows the expected 3 correlations, 1211, 1212, and 1213, for waveform $\{s_{2,n}\}$ 220. In this example, the 160 sample preamble is complete at sample 500, 1213.

FIG. 13 is an example of the graphical representation of the three summation outputs 915, 1015 and 1115 from the correlator structures 900, 1000 and 1100 respectively, for an input signal $r_n$ with a CFO=0 Hz. Graph 1310 is an example of the output from summation block 915 and plots the magnitude of the complex output for k=0, $|y^{160,0}|$, against time (samples). Graph 1320 is an example of the output from summation block 1015 and plots the magnitude of the complex output for k=1, $|y^{160,1}|^2$, against time (samples). Graph 1330 is an example of the output from summation block 1115 and plots the magnitude of the complex output for k=−1, $|y^{160,-1}|^2$, against time (samples). As may be observed, the peak correlation is 1311, at time sample 500, in graph 1310. This is the expected output as the CFO is zero and hence only the terms for k=0 are required in equation (15).

FIG. 14 is an example of the graphical representation of the three summation outputs 915, 1015 and 1115 from the correlator structures 900, 1000 and 1100 respectively, for an input signal $r_n$ with a CFO=116000 Hz. Graph 1410 is an example of the output from summation block 915 and plots the magnitude of the complex output for k=0, $|y^{160,0}|^2$, against time (samples). Graph 1420 is an example of the output from summation block 1015 and plots the magnitude of the complex output for k=1, $|y^{160,1}|^2$, against time (samples). Graph 1430 is an example of the output from summation block 1115 and plots the magnitude of the complex output for k=−1, $|y^{160,-1}|^2$, against time (samples).

As may be observed, the peak correlation is 1421, at time sample 500, in graph 1420. This is the expected output as the CFO is close to the maximum offset value and hence the terms for k=1 in equation (15) dominate.

FIG. 15 is an example of the graphical representation of the three summation outputs 915, 1015 and 1115 from the correlator structure 900, 1000, and 1100 respectively, for an input signal $r_n$ with a CFO=−116000 Hz. Graph 1510 is an example of the output from summation block 915 and plots the magnitude of the complex output for k=0, $|y^{160,0}|^2$, against time (samples). Graph 1520 is an example of the output from summation block 1015 and plots the magnitude of the complex output for k=1, $|y^{160,1}|^2$, against time (samples). Graph 1530 is an example of the output from summation block 1115 and plots the magnitude of the complex output for k=−1, $|y^{160,-1}|^2$, against time (samples). As may be observed, the peak correlation is 1531, at time sample 500, in graph 1530. This is the expected output as the CFO is close to the minimum offset value and hence the terms for k=−1 in equation (14) dominate.

It may be observed that for a maximum possible frequency error of 20 ppm, as defined in the Standard, if the transmitter and receiver clocks have the maximum allowable error, but with opposite signs, then the total error will be 40 ppm. This results in the maximum possible CFO=233 kHz. In this case, in order to cover the complete CFO range, with reference to equation (15) the correlator bank for K=1 may be designed with template frequency offsets 78125·k for k=−2, −1, 0, 1, 2 thus creating a "net" for capturing the long preamble signal over the entirety of the possible frequency offset range. This would add two more summation blocks to the correlation structure in FIG. 8 and just four multiplier blocks. However, assuming that an accurate time reference is used in the receiver, which is practical for a modern wireless device, then the correlator structure as discussed above with reference to FIGS. 9, 10 and 11 is sufficient.

In another embodiment of this disclosure, the complex received signal $\{r_n\}$ may also be quantized such that the length-32 complex tap delay line 710 has only a single bit. Quantizing the received signal results in a coarser correlation and hence a reduced performance but with a single bit, in place of, for example, 16 bits, significantly reduces the complexity and size of the length-32 tap delay line 710 and the connections 720, 901, 1002, 1003, 1102 and 1103, as depicted in FIGS. 9, 10 and 11.

FIG. 16 is a graph 1600 of an example of the performance curves showing the probability of missed long preamble detection $1-P_d$ versus symbol-energy-to-noise-density ratio $E_s/N_o$ for the dual, length-32 correlator structure 900. Plot 1610 is for an additive white Gaussian noise, AWGN, channel and plot 1620 is for a 2-ray multipath channel. For each simulation trial, the packet time-of-arrival and frequency offset were randomized, and 100,000 independent trials were evaluated for each simulation point. For an AWGN channel the preamble detection, $P_d$, is 90% for $E_s/N_0$=−3.5 dB, 1630, i.e., a 10% packet detection error rate. This sensitivity is well in line with the performance of a typical OFDM payload demodulator and decoder.

Plot 1640 is for an AWGN, channel and plot 1650 is for a 2-ray multipath channel for the dual, length-32 correlator structure 900 but where the input received signal is quantized and the length-32 complex tap delay line 820 is a single bit. For an AWGN channel the preamble detection, $P_d$, is 90% for $E_s/N_0$=−1.5 dB, 1645, This sensitivity, although less than when a 16 bit tap delay line is used, is still well in line with the performance of a typical OFDM payload demodulator and decoder.

To declare that a packet has been successfully detected, a correlation peak above a preset level must occur on at least one of the three correlator outputs, 915, 1015, and 1115. The preset correlation level may be determined by several means including measurements and calculations. An example of a method to determine the threshold correlation by calculation, is to define a normalized sync-hit test for each of the correlator outputs, 915, 1015, and 1115 as follows:

$$\text{SYNC\_HIT}_n^{(160,k)} = \begin{cases} 1 & |y_n^{(160,k)}|^2 \geq \eta \cdot e_n \\ 0 & |y_n^{(160,k)}|^2 < \eta \cdot e_n \end{cases} \tag{16}$$

Where $\{e_n\}$ is the normalization energy signal:

$$e_n = E_w \cdot \sum_{m=0}^{159} |r_{n+m+1-160}|^2$$

With constant scalar:

$$E_w = \left\lceil \left\{ \frac{1}{3} \sum_{k=-1}^{1} \left[ 3 \cdot \sum_{m=0}^{31} |w_{2,m}^{(32,k)}|^2 + 2 \cdot \sum_{m=0}^{31} |w_{1,m}^{(32,k)}|^2 \right] \right\} + 0.5 \right\rceil = 222$$

And preferred normalized threshold setting η=0.113.

A packet may then be determined to be successfully detected if SYNC_HIT=1, equation (16), on at least one of the three correlator outputs 915, 1015, and 1115.

FIG. 17 is a schematic diagram of an example correlator apparatus 1700 that may be used to implement an OFDM preamble correlator as discussed above with reference to FIGS. 9, 10 and 11. The example correlator 1700 comprises a 32-tap I/Q delay line 1701, control logic 1790, three MUX and correlator blocks 1750, 1760 and 1770, three delay blocks 1751, 1761 and 1771, pipeline control registers 1780, a multi-input accumulator 1781 and pipeline control registers 1782.

The 32-tap delay line 1701 comprises two delay lines, one for the in-phase components, I, of the received bit stream, and the other for the quadrature components, Q. The 32-tap delay line 1701 performs the functions as discussed above with reference to length-32 tap delay line 710.

MUX and correlator block 1750 includes a correlator 1 MUX 1703 followed by three multi-input accumulators 1706, 1707 and 1708 and multi-input accumulator 1711. In addition, there are pipeline control registers 1704, 1709 and 1712 controlling the data selections between the correlator 1 MUX 1703, the three multi-input accumulators (1706, 1707, 1708), and after the multi-input accumulator 1711. MUX and correlator block 1750 also includes a correlator 2 MUX 1723 followed by three multi-input accumulators 1726, 1727 and 1728 and multi-input accumulator 1731. Similarly, there are pipeline control registers 1724, 1729 and 1732 controlling the data selections between the correlator 2 MUX 1723, the three multi-input accumulators (1726, 1727, 1728), and after the multi-input accumulator 1731.

As an example, MUX and correlator block 1750 performs the functions as discussed above with reference to FIG. 9 and MUX 720, MUX 901, and correlators 903 and 904 corresponding to the correlation for k=0. Taps from the I/Q 32-tap delay line 1701 are connected to correlator 1 MUX 1703 which is connected via pipeline control registers 1704 to 3 input accumulators 1706, 1707 and 1708. Each component from correlator 1 MUX 1703 is chosen from the I and Q value in the delay line 1701 at different clock cycles as controlled by the control logic 1790 and the pipeline control registers 1704. Similarly, taps from the delay line 1701 are connected to correlator 2 MUX 1723 which is connected via pipeline control registers 1724 to 3 input accumulators 1726, 1727 and 1728. Each component from correlator 2 MUX 1723 is chosen from the I and Q value in the delay line 1701 at different clock cycles as controlled by the control logic 1790 and the pipeline control registers 1724. The three multi-input accumulators 1706, 1707, 1708 and 1726, 1727, 1728 perform the summation functions as discussed above with reference to FIGS. 6 and 7, and summation blocks (e.g., pre-adders 621 to 628). The phase adjustments −1, 0, −1, or −j, 0, j are performed by the three multi-input accumulators 1706, 1707, 1708 and 1726, 1727, 1728 are controlled by the pipeline control registers 1704 and 1724 respectively. The three multi-input accumulators 1706, 1707, 1708 are connected, via pipeline control registers 1709 to the multi-input accumulator 1711. The three multi-input accumulators 1726, 1727, 1728 are connected, via pipeline control registers 1729 to the multi-input accumulator 1731. The pipeline control registers 1712 and 1732 are connected to sample delays 1744 and 1742 respectively in the delay block 1751. The delay block 1751 comprises a 32 sample delay 1742 and three 64 sample delays 1743, 1744 and 1745 performing the functions as discussed above with reference to FIG. 9 and delays 905, 906, 907 and 908 respectively.

The other MUX and correlator blocks, 1760 and 1770 comprise the similar entities as MUX and correlator block 1750. As an example, MUX and correlator block 1760 performs the functions as discussed above with reference to FIG. 10 and MUX 1002, MUX 1001, and correlators 1003 and 1004 corresponding to the correlation for k=1. Similarly, as an example, MUX and correlator block 1770 performs the functions as discussed above with reference to FIG. 11 and MUX 1102, MUX 1101, and correlators 1103 and 1104 corresponding to the correlation for k=−1.

Delay blocks 1761 and 1771 are identical to delay block 1751. MUX and correlator block 1760 connects to delay block 1761 and MUX and correlator block 1770 connects to delay block 1771. All three delay blocks, 1751, 1761 and 1771 output to pipeline control registers 1780 which controls the outputs from the delay blocks into multi-input accumulator 1781 which performs the summation function as discussed above with reference to FIGS. 9, 10 and 11, namely summation blocks 909, 1012, and 1111. Multi-input accumulator 1781 inputs to pipeline control registers 1782 which provides the three correlator outputs 1785, 1786, 1787 that correspond to $$y_n^{(160,0)}915,\ y_n^{(160,1)}1015,\ y_n^{(160,-1)}1115,$$

respectively. Preamble detector 1795 determines if a correlation peak above a preset level has occurred on at least one of the three correlator outputs, 1785, 1786 or 1787 in order to declare that a preamble has been detected.

FIG. 18 is a block diagram of an example of a network traffic analyzer 1800 (i.e., a wireless device) that may be used to monitor OFDM signals across a wide band. For example, such a network traffic analyzer 1800 may be used to monitor OFDM traffic over the entire 5 GHz band used by Wi-Fi. In some embodiments the network traffic analyzer 1800 includes an antenna 1801, a wideband front end 1802, an RF channelizer 1803, a block of OFDM preamble correlators 1805, a block of OFDM receivers 1810, a block of data analyzers 1820, and processing circuitry 1830. The wideband front end 1802 may perform the usual functions of an RF front end such as low noise amplification, filtering, and I/Q frequency down conversion so as to condition the received signal for inputting to the RF channelizer 1803. The RF channelizer may perform the function of filtering the wideband received signal into discrete channels. For example, if the wideband front end 1802 detects signals across the 5 GHz band (5160 to 5885 MHz) there are 31 20 MHz Wi-Fi channels. The individual channel I/Q data streams may be inputted to an individual OFDM preamble detector 1700 in the block of OFDM preamble correlators 1805. If an OFDM signal is detected by the OFDM preamble correlator 1700, then the received data stream may be inputted to an OFDM receiver 1807 in the block of OFDM receivers 1810. Each OFDM receiver 1807 may perform the Wi-Fi OFDM functions of I/Q demodulation, guard interval removal, FFT (fast Fourier transform), pilot removal, de-interleaving, de-mapping, decoding and descrambling and demodulating so as to condition the received signal suitable for inputting to a for data analysis in a data analyzer 1822 in the block of data analyzers 1820. Although shown in FIG. 18 as a number of discrete data analyzers 1822, the function of the block of data analyzers 1820 may be performed by one or more processors and/or processor cores and/or FPGAs.

In some embodiments the wideband front end 1802, the RF channelizer 1803 and the OFDM receiver 1807 and/or the processing circuitry 1830 may comprise a processor 1831, integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments some or all of the functions of the wideband front end 1802, the RF channelizer 1803 and the OFDM receiver 1807 may be performed by the processing circuitry 1820. The processing circuitry 1830 may be configured to control any of the methods and/or processes described herein and/or to cause such methods, and/or processes to be performed. The memory module 1832 is configured to store data, programmatic software code and/or other information described herein. In some embodiments, the software may include instructions that, when executed by the processing circuitry 1830, causes the processing circuitry 1830 to perform the processes described herein with respect to the network traffic analyzer 1800. Further, processing circuitry 1830 may comprise analyzer unit 1833 configured to perform any step and/or task and/or process and/or method and/or feature described in the present disclosure, e.g., network analyzer functions (e.g., wireless device functions).

It may be noted that in such a wideband network traffic analyzer 1800, where the traffic is analyzed across a significant number of channels, a relatively large number of OFDM preamble correlators 1700 are needed, for example thirty one. A low complexity OFDM preamble correlator 1700 as disclosed herein, and discussed above with reference to FIG. 17 is therefore advantageous in that its low complexity represents a significant saving in related implementation size and costs to a conventional OFDM preamble detector that involves multiplication stages.

The disclosed method results in a low complexity long preamble correlator as discussed above with reference to FIGS. 9, 10, 11 and 17 for Wi-Fi Clause 17 OFDM packets.

FIG. 19 is an example flowchart 1900 of the steps of a method to construct the disclosed OFDM long preamble correlator. The method may start at step 1901 where it is noted that the long preamble comprises two length-32 fundamental waveforms. As discussed above with reference to FIG. 2, the long preamble may be represented by two fundamental waveforms, $\{s_{1,n}\}$ 210 and $\{s_{2,n}\}$ 220 and the complete length-160 long preamble comprises the sequence, $\{s_{2,n}\}\{s_{1,n}\}\{s_{2,n}\}\{s_{1,n}\}\{s_{2,n}\}$. The length-160 preamble symbols are provided in Table I-6 of the Standard. At step 1902, as discussed above with reference to equations (5) and (6), a frequency offset index k is defined such that unquantized length-32 templates, $$w_{1,m}^{(32,k)}$$

and $$w_{2,m}^{(32,k)},$$

for the preamble signals $\{s_{1,n}\}$ 210 and $\{s_{2,n}\}$ 220 respectively, for frequency offset index k are given by equations (5) and (6). At step 1903, as discussed above with reference to equation (12), the frequency offset step size to sampling frequency ratio, $f_0/f_s$ may be set to a value of 1/256 noting that for a sampling frequency of 20 Mbps, the frequency offset step is then 78125 Hz.

At step 1904, the preamble signal templates, as discussed above with reference to equations (5) and (6), may be determined.

The templates for k=0, are:

$$\text{for } m = 0 \text{ to } 31 \;\; w_{2,m}^{(32,0)} = s_{2,m} \;\; w_{1,m}^{(32,0)} = s_{1,m}$$

The templates for k=1, are:

$$\text{for } m = 0 \text{ to } 31 \;\; w_{2,m}^{(32,1)} = \exp\left(j\frac{\pi m}{128}\right)\cdot s_{2,m} \;\; w_{1,m}^{(32,1)} = \exp\left(j\frac{\pi m}{128}\right)\cdot s_{1,m}$$

and the templates for k=−1, are:

$$\text{for } m = 0 \text{ to } 31 \;\; w_{2,m}^{(32,-1)} = \exp\left(j\frac{-\pi m}{128}\right)\cdot s_{2,m} \;\; w_{1,m}^{(32,-1)} = \exp\left(j\frac{-\pi m}{128}\right)\cdot s_{1,m}$$

At step 1905, as discussed above with reference to equation (7) and FIGS. 3 and 8, the real and imaginary parts of the templates for k=0, 1 and −1 may be quantized to a 2-bit sign-magnitude representation, $$w_m^{(32,k)}.$$

As discussed above with reference to equations (8) and (9), $$w_m^{(32,k)}$$

may be organized into eight possible non-zero template values. At step 1906, as discussed above with reference to FIGS. 4, 5, 6 and 8 multiplexes (MUX) for each of the three sets of templates $$w_m^{(32,0)},\; w_m^{(32,1)},\text{ and } w_m^{(32,-1)}$$

may be constructed corresponding to the eight non-zero template values. Then at step 1907, as discussed above with reference to FIGS. 6 and 7, the three length-32 correlators may be constructed. At step 1908 as discussed above with reference to equations (14) and (15) and FIGS. 9, 10 and 11, a length-160 correlator $$y_n^{(160,k)}$$

comprising three correlators each having two length-32 correlations $$y_{2,n}^{(32,k)}$$

and $$y_{1,n-32}^{(32,k)}$$

may be constructed by assembling the outputs of the three length-32 correlators using delays and phasors as discussed above with reference to FIGS. 9, 10, 11 to produce an efficient OFDM preamble detection correlator that may be realized by circuitry as discussed above with reference to FIG. 17.

FIG. 20 is an example flowchart 2000 of a method for detection of a packet (and/or packet preamble such as an OFDM packet preamble). Any of the steps of the method may be performed by network traffic analyzer 1800 and/or processing circuitry 1830 and/or processor 1831 and/or memory 1832 and/or analyzer unit 1833. The method comprises, at step 2001, quantizing the real part and the imaginary part of each complex template value associated with the plurality of preamble symbols to a template index value comprising one of a negative one, a zero, and a positive one. At step 2002, a plurality of non-zero template index values is determined based on the quantized real part and the imaginary part of each complex template value. At step 2003, a signal comprising a plurality of samples is received, where the plurality of samples comprises a plurality of sample subsets. The method further includes, at step 2004, performing a plurality of first sums, where each first sum sums a sample subset of plurality of sample subsets, and at step 2005, assigning the plurality of non-zero template index values to the plurality of first sums, a non-zero template index value of the plurality of non-zero template index values being assigned to a corresponding first sum of the plurality of first sums. In addition, the method includes, at step 2006, performing a transposition of each first sum using the assigned non-zero template index value, and at step 2007, performing a second sum that is a complex weighted sum of the transposition of each first sum. Further, the method includes determining that the received signal comprises the OFDM packet preamble based on the complex weighed sum.

As will be appreciated by one of skill in the art, the concepts described herein may be embodied as a method, data processing system, and/or computer program product.

Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the frequency step offset value, the sampling frequency, the quantizing details and method, the order and details of the multiplexing, the method and/or limit to declare a preamble detection, the use of length-32 and length 64 correlators. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings and following claims.

What is claimed is:

1. A method for detection of a packet preamble, the method comprising:

receiving a signal comprising a plurality of samples, the plurality of samples comprising a plurality of sample subsets;

performing a plurality of first sums, each first sum being a sum of a sample subset of the plurality of sample subsets;

assigning a plurality of template index values to the plurality of first sums so that each first sum from the plurality of first sums has a corresponding assigned template index value from the plurality of template index values;

performing a transposition of each first sum of the plurality of first sums using the corresponding assigned template index value;

performing a second sum, the second sum being a complex weighted sum of the transposition of each first sum of the plurality of first sums; and determining whether the received signal comprises a specific type of packet preamble based on the second sum.

2. The method of claim 1, wherein each assigned template index value of the plurality of template index values has a non-zero value.

3. The method of claim 1, wherein in the complex weighed sum is a real time correlation signal of the received signal.

4. The method of claim 1, wherein the method further comprises:

delaying the received signal, the delayed signal being associated with a tap delay line having a predetermined length and being used to perform the plurality of first sums.

5. The method of claim 1, wherein the specific type of packet preamble is an orthogonal frequency division multiplex (OFDM) packet preamble.

6. The method of claim 5, wherein the OFDM packet preamble is an OFDM long preamble, and the method further comprises:

determining that the OFDM long preamble is represented by two length-32 waveforms, $\{s_{1,n}\}$ and $\{s_{2,n}\}$.

7. The method of claim 6, wherein the OFDM long preamble is a length-160 OFDM long preamble comprising a sequence, $\{s_{2,n}\}\{s_{1,n}\}\{s_{2,n}\}\{s_{1,n}\}\{s_{2,n}\}$.

8. The method of claim 7, wherein the method further comprises:

determining a length-160 correlator comprising K correlators, each K correlator having two length-32 correlators comprising delays and phasors;

determining a maximum output of the K length-160 correlators; and determining whether the OFDM long preamble has been detected based on the maximum output.

9. The method of claim 8, wherein the second sum is a length-160 long preamble signal.

10. A wireless device for detection of a packet preamble, the wireless device comprising processing circuitry configured to:

receive a signal comprising a plurality of samples, the plurality of samples comprising a plurality of sample subsets;

perform a plurality of first sums, each first sum being a sum of a sample subset of the plurality of sample subsets;

assign a plurality of template index values to the plurality of first sums so that each first sum from the plurality of first sums has a corresponding assigned template index value from the plurality of template index values;

perform a transposition of each first sum of the plurality of first sums using the corresponding assigned template index value;

perform a second sum, the second sum being a complex weighted sum of the transposition of each first sum of the plurality of first sums; and determine whether the received signal comprises a specific type of packet preamble based on the second sum.

11. The wireless device of claim 10, wherein each template index value of the plurality of template index values has a non-zero value.

12. The wireless device of claim 10, wherein in the complex weighed sum is a real time correlation signal of the received signal.

13. The wireless device of claim 10, wherein the processing circuitry is further configured to:

delay the received signal, the delayed signal being associated with a tap delay line having a predetermined length and being used to perform the plurality of first sums.

14. The wireless device of claim 10, wherein the specific type of packet preamble is an orthogonal frequency division multiplex (OFDM) packet preamble.

15. The wireless device of claim 14, wherein the OFDM packet preamble is an OFDM long preamble, and the processing circuitry is further configured to:

determine that the OFDM long preamble is represented by two length-32 waveforms, $\{s_{1,n}\}$ and $\{s_{2,n}\}$.

16. The wireless device of claim 15, wherein the OFDM long preamble is a length-160 OFDM long preamble comprising a sequence, $\{s_{2,n}\}\{s_{1,n}\}\{s_{2,n}\}\{s_{1,n}\}\{s_{2,n}\}$.

17. The wireless device of claim 16, wherein the processing circuitry is further configured to:

determine a length-160 correlator comprising K correlators, each K correlator having two length-32 correlators comprising delays and phasors;

determine a maximum output of the K length-160 correlators; and determine whether the OFDM long preamble has been detected based on the maximum output.

18. A system comprising a wireless device configured for detection of a packet preamble, the wireless device comprising processing circuitry configured to:

receive a signal comprising a plurality of samples, the plurality of samples comprising a plurality of sample subsets;

perform a plurality of first sums, each first sum being a sum of a sample subset of the plurality of sample subsets;

assign a plurality of template index values to the plurality of first sums so that each first sum from the plurality of first sums has a corresponding assigned template index value from the plurality of template index values;

perform a transposition of each first sum of the plurality of first sums using the corresponding assigned template index value;

perform a second sum, the second sum being a complex weighted sum of the transposition of each first sum of the plurality of first sums; and determine whether the received signal comprises a specific type of preamble packet based on the second sum.

19. The system of claim 18, wherein the processing circuitry is further configured to:

delay the received signal, the delayed signal being associated with a tap delay line having a predetermined length and being used to perform the plurality of first sums.

20. The system of claim 18, wherein the specific type of packet preamble is an orthogonal frequency division multiplex (OFDM) packet preamble.

* * * * *